US011797959B1

(12) United States Patent
Goetz et al.

(10) Patent No.: US 11,797,959 B1
(45) Date of Patent: *Oct. 24, 2023

(54) CASH CONTAINER FOR UNMANNED VEHICLE ENABLING DELIVERY FOR MULTIPLE CUSTOMERS PER TRIP

(71) Applicant: Wells Fargo Bank, N.A., San Francisco, CA (US)

(72) Inventors: Darren M. Goetz, Salinas, CA (US); Ashish B. Kurani, Hillsborough, CA (US); JoAnn Mar, San Francisco, CA (US); Dennis E. Montenegro, Concord, CA (US); Joseph Ng, San Mateo, CA (US); Damodar Raval, San Francisco, CA (US); Lisa Schur, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/973,802

(22) Filed: Oct. 26, 2022

Related U.S. Application Data

(63) Continuation of application No. 16/660,649, filed on Oct. 22, 2019, now Pat. No. 11,526,861.

(51) Int. Cl.
*G06Q 20/10* (2012.01)
*G05D 1/00* (2006.01)
(Continued)

(52) U.S. Cl.
CPC ....... *G06Q 20/1085* (2013.01); *B64C 39/024* (2013.01); *G05D 1/0011* (2013.01);
(Continued)

(58) Field of Classification Search
None
See application file for complete search history.

(56) References Cited

U.S. PATENT DOCUMENTS 5,895,456 A    4/1999  Beale et al.
9,070,101 B2   6/2015  Abhyanker
(Continued)

OTHER PUBLICATIONS

Boysen et al., Last-mile delivery concepts: a survey from an operational research perspective. OR Spectrum 43, 1-58. https://doi.org/10.1007/s00291-020-00607-8 (Year: 2020).*

(Continued)

*Primary Examiner* — Paul S Schwarzenberg
(74) *Attorney, Agent, or Firm* — Foley & Lardner LLP

(57) ABSTRACT

Systems, methods, and apparatuses described herein relate to a method for delivering cash by an unmanned vehicle to a plurality of customers at different locations. The method includes receiving cash delivery requests from user devices of the plurality of customers via a communications network. The method includes determining a path for the unmanned vehicle from a current location of the unmanned vehicle to Global Position System (GPS) locations of the user devices of the plurality of customers. The method also includes instructing each of the plurality of compartments of a cash container of the unmanned vehicle to open in response to authenticating a corresponding customer of the plurality of customers or a corresponding user device of the user devices that generated a corresponding cash delivery request for which each of the plurality of compartments is storing cash.

20 Claims, 8 Drawing Sheets

(51) Int. Cl.
*G06Q 10/083* (2023.01)
*B64C 39/02* (2023.01)
*G05D 1/02* (2020.01)
*G06Q 20/40* (2012.01)
*G08G 5/00* (2006.01)
*B64U 101/60* (2023.01)

(52) U.S. Cl.
CPC ......... *G05D 1/0022* (2013.01); *G05D 1/0088* (2013.01); *G05D 1/0202* (2013.01); *G06Q 10/083* (2013.01); *G06Q 20/40145* (2013.01); *G08G 5/0034* (2013.01); *B64U 2101/60* (2023.01); *B64U 2201/104* (2023.01)

(56) References Cited

U.S. PATENT DOCUMENTS

| | | | | |
|---|---|---|---|---|
| 9,623,553 | B1* | 4/2017 | Theobald | G05B 19/41895 |
| 10,040,552 | B2 | 8/2018 | Gordon et al. | |
| 10,245,993 | B1* | 4/2019 | Brady | B60P 1/6418 |
| 10,308,430 | B1* | 6/2019 | Brady | G05D 1/0027 |
| 2014/0254896 | A1* | 9/2014 | Zhou | G06Q 20/3829 |
| | | | | 382/124 |
| 2016/0012411 | A1* | 1/2016 | Kursun | G06Q 40/02 |
| | | | | 705/42 |
| 2017/0124789 | A1* | 5/2017 | Rephlo | G06Q 10/083 |
| 2017/0228690 | A1 | 8/2017 | Kohli | |
| 2018/0088598 | A1* | 3/2018 | Lection | B64C 39/024 |
| 2018/0105289 | A1* | 4/2018 | Walsh | B60L 53/51 |
| 2018/0149486 | A1* | 5/2018 | Spears | G01C 21/3484 |
| 2019/0051090 | A1 | 2/2019 | Goldberg et al. | |
| 2019/0205850 | A1* | 7/2019 | Deluca | G07F 9/001 |

OTHER PUBLICATIONS

Gera, Ishaan, ATM's to loans, here's how drones can reduce need for physical banking. Financial Express Weekly, May 27, 2017 https://www.financialexpress.com/industry/atms-to-loans-heres-how-drones-can-reduce-need-for-physical-banking/688084/ (Year: 2017).*
Boysen et al., "Last-Mile Delivery Concepts: A Survey From an Operational Research Perspective," OR Spectrum 43, (2021) pp. 1-58. https://doi.org/10.1007/s00291-020-00607-8.
Gera, Ishaan, ATM's to loans, here's how drones can reduce need for physical banking:, https://www.financialexpress.com/industry/technology/atms-to-loans-heres-how-drones-can-reduce-need-for-physical-banking/688084/ May 27, 2017. 6 pages.

* cited by examiner

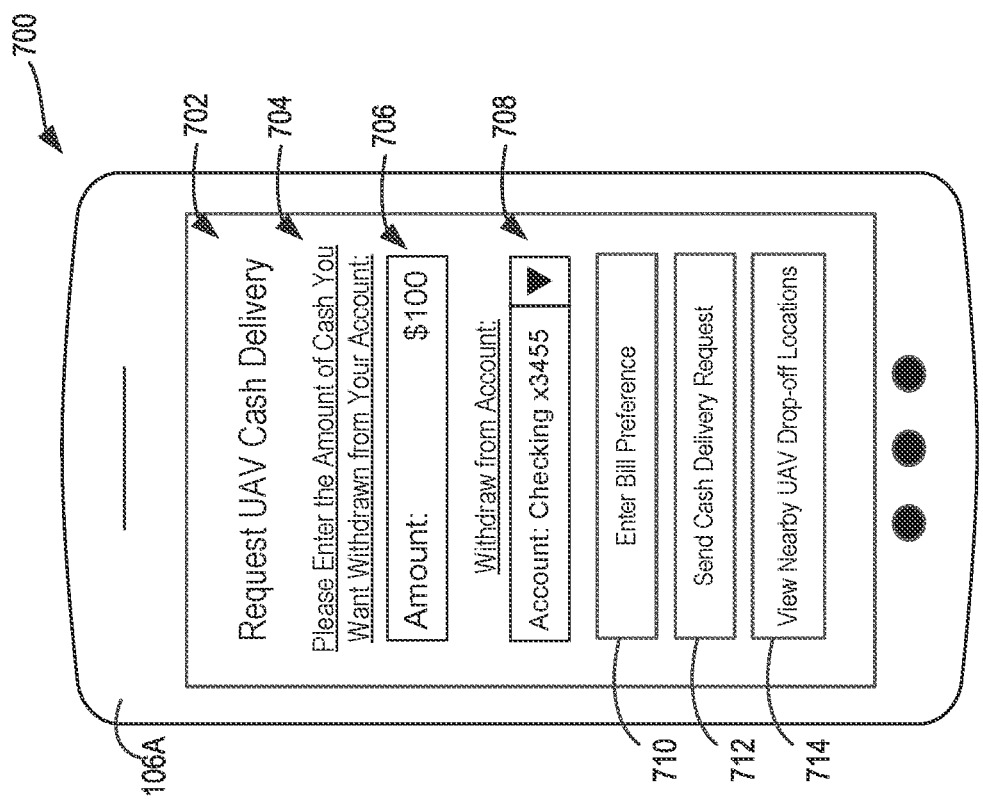

CASH CONTAINER FOR UNMANNED VEHICLE ENABLING DELIVERY FOR MULTIPLE CUSTOMERS PER TRIP

CROSS-REFERENCE TO RELATED PATENT APPLICATIONS

This application is a continuation of U.S. patent application Ser. No. 16/660,649, titled "CASH CONTAINER FOR UNMANNED VEHICLE ENABLING DELIVERY FOR MULTIPLE CUSTOMERS PER TRIP," filed Oct. 22, 2019, the contents of which is hereby incorporated by reference in its entirety and for all purposes.

BACKGROUND

Traditionally, a user who would like cash normally spends time finding an Automated Teller Machine (ATM) or nearby bank branch of his or her financial institution, and then taking the time to get to the location of the ATM or the bank branch in order to withdraw cash. However, the user may not have the time or means to make it to the nearest ATM or the bank branch or may not want to wait for or interact with the employees and other customers at the bank branch.

SUMMARY

In various arrangements, a method for delivering cash by an unmanned vehicle to a plurality of customer, the plurality of customers being at different locations, includes receiving, by a provider computing system, cash delivery requests from user devices of the plurality of customers via a communications network. The method further includes determining, by the provider computing system, a path for the unmanned vehicle from a current location of the unmanned vehicle to Global Position System (GPS) locations of the user devices of the plurality of customers. The method also includes instructing, by the provider computing system, each of the plurality of compartments of a cash container to open in response to authenticating a corresponding customer of the plurality of customers or a corresponding user device of the user devices that generated a corresponding cash delivery request for which each of the plurality of compartments is storing cash.

In various arrangements, a provider computing system for providing authentication with respect to several cash delivery requests made by several customers operating various user devices of the customers includes a network interface circuit configured to communicate with a plurality of customer user devices, a cash container, and an unmanned vehicle. The provider computing system also includes at least one processor operatively coupled to non-transient memory to form a processing circuit. The processor is configured to receive cash delivery requests from user devices of the plurality of customers via a communications network, instruct a robotic device to load a plurality of compartments of a cash container of the unmanned vehicle with cash, determine a path for the unmanned vehicle from a current location of the unmanned vehicle to the GPS locations of the user devices of the plurality of customers, and instruct each of the plurality of compartments of the cash container to open in response to authenticating a corresponding customer of the plurality of customers or a corresponding user device of the user devices that generated a corresponding cash delivery request for which each of the plurality of compartments is storing the cash.

In some arrangements, a non-transitory computer-readable medium includes computer-readable instructions such that, when executed by a processor, causes the processor to receive cash delivery requests from a plurality of customer user devices via a communications network, instruct a robotic device to load a plurality of compartments of a cash container of the unmanned vehicle with cash, determine a path for the unmanned vehicle from a current location of the unmanned vehicle to the GPS locations of the plurality of customer user devices, and instruct each of the plurality of compartments of the cash container to open in response to authenticating a corresponding customer of the plurality of customers or a corresponding customer user device of the plurality of customer user devices that generated the cash delivery request for which each of the plurality of compartments is storing the cash.

These and other features, together with the organization and manner of operation thereof, will become apparent from the following detailed description when taken in conjunction with the accompanying drawings.

BRIEF DESCRIPTION OF THE FIGURES

FIG. 7 is a schematic drawing depicting an example user interface of the customer user device used in the environment of FIG. 1, according to various arrangements.

DETAILED DESCRIPTION

Figure 1A:
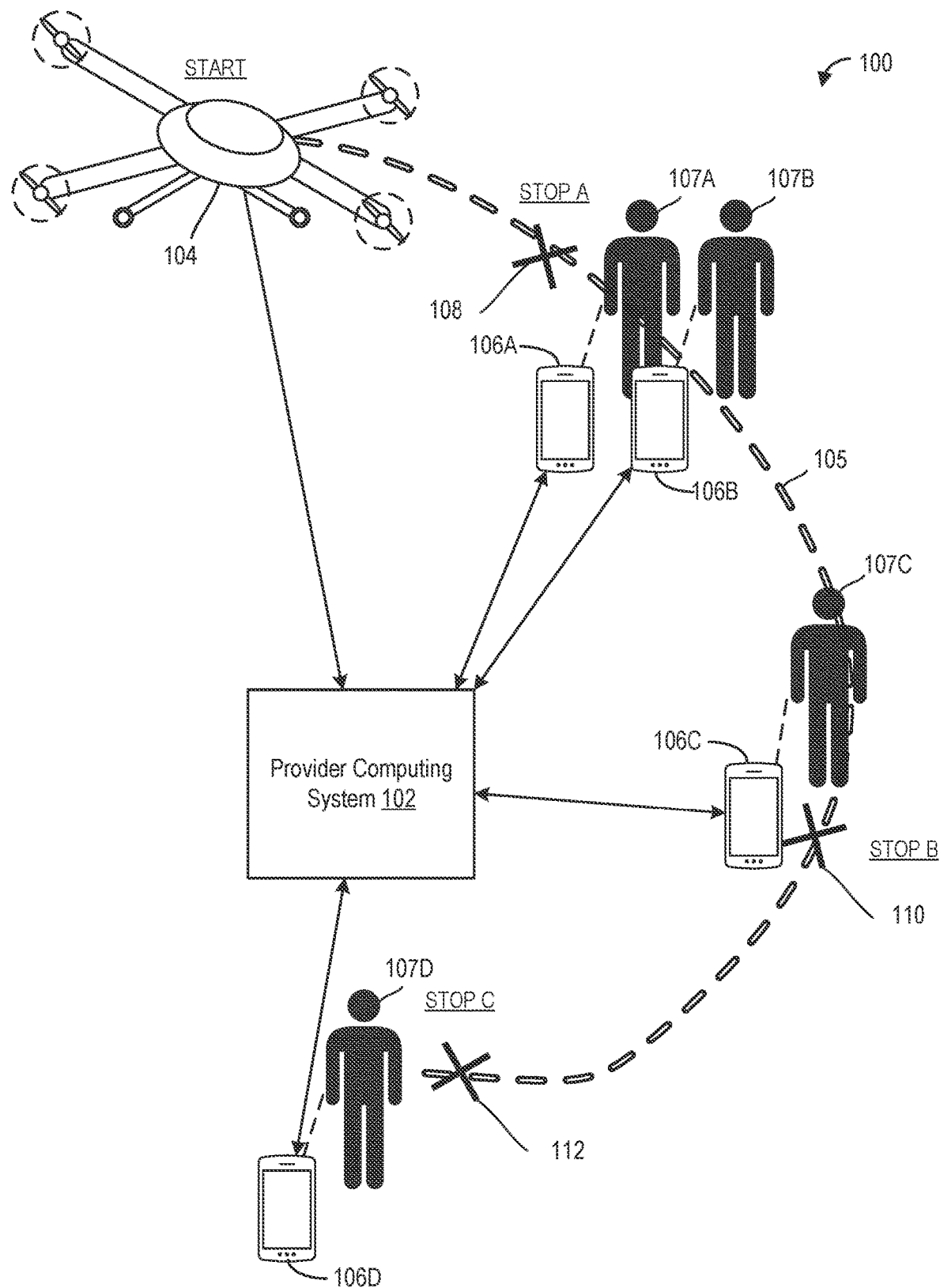
FIGS. 1A and 1B are block diagrams illustrating a system for generating and communicating a cash delivery request between user devices, an unmanned vehicle transporting a cash container, and a provider computing system, according to various arrangements.

Referring generally to the FIGS., arrangements described herein relate to various systems, apparatuses, methods, and non-transitory computer-readable media for securely and proficiently delivering cash from a cash container to multiple customers at multiple locations via an unmanned vehicle. In some arrangements, several customers of a provider institution, such as a financial institution, request an amount of cash to be delivered to the respective customer using an online cash delivery application on the several user devices of the customers. In some arrangements, a path for an unmanned vehicle, such as an unmanned aerial vehicle (UAV), an unmanned ground vehicle (UGV), and so on, is determined to deliver the several payloads of the cash delivery requests to the various customers at different locations in a single trip. In various arrangements, the path for the unmanned vehicle is determined with the consideration of several factors, such as but not limited to, optimized pathing for the quickest delivery time, the amount of cash requested in each of the cash delivery requests serviced in a same trip or in different trips, and the transaction history of each of the several customers who made a cash delivery request. Once the unmanned vehicle is at one of the drop-off locations (i.e., delivery location), where one or more customers may receive a cash delivery, each customer and/or user device of the customer may be authenticated. In some arrangements, in response to the authentication of a customer and/or customer user device that made a cash delivery request, one of several compartments of the cash container that stores cash for the authenticated customer and/or customer user device opens. Each of the compartments of the cash container may store and dispense cash for one specific cash delivery request and are individually and independently unlocked and opened in response to the correct authorization. In various arrangements, the order in which the compartments of the cash container are loaded with cash can be based on the prioritization factors considered in determining the delivery path for the unmanned vehicle. In some examples, cash corresponding to a cash delivery request sent by a customer experiencing a severe life-event is loaded into a compartment of the cash container before cash corresponding to other cash delivery requests sent by customers who are not experiencing the serve life-event. In other examples, the unmanned vehicle may deliver cash to (and unlock a corresponding one of the compartments of the cash container for) a customer who requested a greater amount of cash than the other amounts requested via other cash delivery requests, before the other amounts of cash are delivered corresponding to other cash delivery requests.

The systems and methods described herein overcome the inefficiencies of customers determining a location of an ATM or bank branch and retrieving the cash themselves. Usually, if a customer of a provider institution desires cash, the customer searches the internet for a nearby ATM or bank branch and then makes the effort to walk, drive, or commute to one of the two options closest to the customer. However, a customer may be pressed for time and may have other things that the customer wants to accomplish instead of retrieving cash from an ATM. To address such issues, the system described herein can determine a path for delivering cash from a cash container to multiple customers in one trip using an unmanned vehicle, such as a UAV or a UGV, as the unmanned delivery agent. Additionally, the system described herein can provide extra security for each individual cash delivery request by authenticating each customer at a drop-off location before the cash is available to take from a compartment of the cash container. For example, only one compartment of the cash container may be open at a time while the others remain locked, and the compartment of the cash container may only open in response to the customer or the customer user device of the customer presents a cash authentication code (CAC), such as but not limited to, a barcode or a virtual identity card, that is verified by a provider computing system of the provider institution.

Referring to FIG. 1A, a block diagram of a cash delivery request system 100 is shown, according to some arrangements. Referring to FIG. 1A, the system 100 is shown to include at least a provider computing system 102, an unmanned vehicle 104, and several customer user devices 106A-106D of customers 107A-107D. The customer user device 106A is used by the customer 107A, the customer user device 106B is used by the customer 107B, the customer user device 106C is used by the customer 107C, and the customer user device 106D is used by the customer 107D. Although only the customers 107A-107D are shown, the system 100 can be leveraged to delivery cash to any number of customers. The customer 107A and the customer 107B may be at the same location and/or go to the same drop-off location to retrieve the cash delivery request for the respective customer 107A and the customer 107B. However, each of the customer 107C and the customer 107D are at locations different from the other customers shown. As referred to herein, the location of the customer 107A corresponds to the location of the customer user device 106A as determined from location data (e.g., GPS data) provided by the customer user device 106A, where the customer 107A is assumed to be carrying the customer user device 106A. Similarly, the locations of the other customers 107B-107D shown in system 100 correspond to the locations of the respective user devices 106B-106D of the customers 107B-107D as calculated from location data provided by the respective user devices 106B-106D of the customers 107B-107D (e.g., the location of the customer 107B corresponds to the location of the customer user device 106B, the location of the customer 107C corresponds to the location of the customer user device 106C, and the location of the customer 107D corresponds to the location of the customer user device 106D).

In an example arrangement, the provider computing system 102 is communicably connected to the unmanned vehicle 104 and the customer user devices 106A-106D via a network (e.g., a network 114 of FIG. 1*i*). Each of the customers 107A-107D, via the respective ones of the customer user devices 106A-106D, makes a request for cash to be delivered to the location of the respective one of the customer user devices 106A-106D by sending a cash delivery request to the provider computing system 102. The provider computing system 102 can process each cash delivery request and determine a flight path 105 for the unmanned vehicle 104 to take from a base ("START") of the unmanned vehicle 104 to the location of each of the customer user devices 106A-106D to deliver the cash for each cash delivery request in a single trip. In response to the provider computing system 102 receiving a cash delivery request from the customer user device 106A, the provider computing system 102 sends a CAC to the customer user device 106A to use as verification by a cash container device 140 (FIG. 1B) of the unmanned vehicle 104 when the unmanned vehicle 104 arrives at the location of the customer user device 106A. In some arrangements, the CAC is a barcode, a quick response (QR) code, a one-time access code, a virtual card, a communication signal (e.g., a near field communication (NFC) signal), or so on. After the customer 107A finishes withdrawing the cash from the corresponding compartment of the cash container device 140 for the cash delivery request, the next customer may be authorized to unlock another compartment of the cash container device 140 (FIG. 1*i*). That is, the customer 107B and/or the customer user device 106B may be authenticated to unlock the compartment storing the cash requested by the cash delivery request sent from the customer user device 106B.

In some arrangements, the unmanned vehicle 104 (originally at "START") moves along a flight path 105 to proceed to "STOP A" 108 to deliver cash to the customers 107A and 107B. At "STOP A" 108, the provider computing system 102 may authenticate the customers 107A and 107B and/or the customer user devices 106A and 106B and unlock the corresponding compartments of the cash container device 140 (FIG. 1B) for the customers 107A and 107B to retrieve the cash or dispense the cash directly to the customers 107A and 107B in response to authentication. Once each of the customers 107A and 107B at the "STOP A" 108 retrieves the correct cash from the cash container device 140 (FIG. 1B) of the unmanned vehicle 104, the unmanned vehicle 104 launches from the drop-off location at the "STOP A" 108 and continues along the flight path 105 to the "STOP B" 110 to deliver cash to the customer 107C. At the "STOP B" 110, the provider computing system 102 may authenticate the customer 107C and/or the customer user device 106C and unlock the corresponding compartment of the cash container device 140 (FIG. 1B) for the customer 107C to retrieve the cash or dispense the cash directly to the customer 107C in response to authentication. The unmanned vehicle 104 may then continue on the flight path 105 determined by the provider computing system 102 to deliver the last cash delivery request to the customer 107D at the "STOP C" 112. In some arrangements, once the customer user device 106D and/or the customer 107D is authenticated by the provider computing system 102, the compartment corresponding to the cash delivery request is opened, and the customer 107D retrieves the cash, the unmanned vehicle 104 may return back to a base (e.g., at "START" or at another location) to recharge. While the unmanned vehicle 104 recharges, a robotic device may simultaneously load the cash container device 140 (FIG. 1B) of the unmanned vehicle 104 with more cash for new cash delivery requests.

Figure 1B:
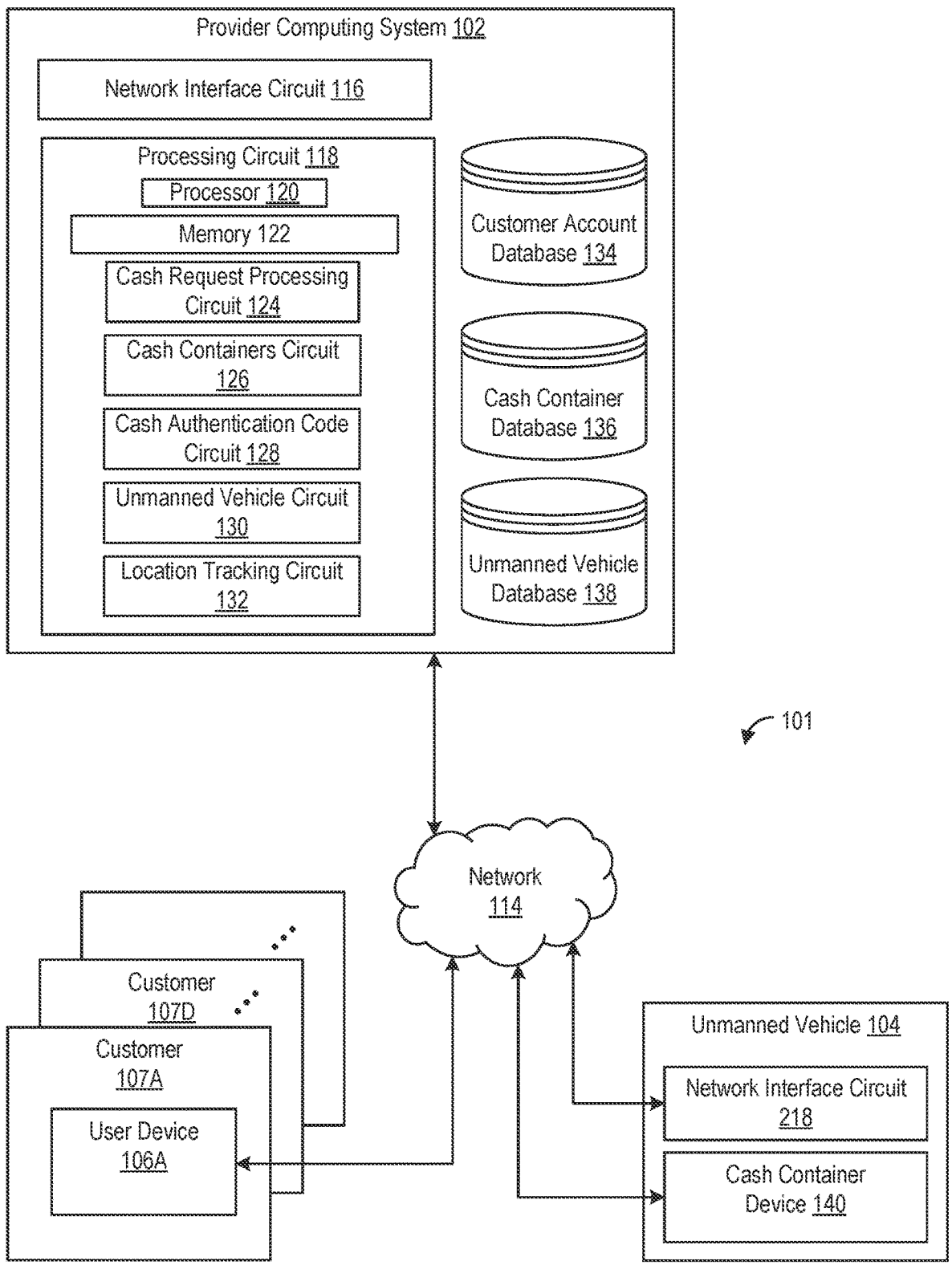

Referring to FIG. 1B, a block diagram of a cash delivery request system 101 is shown, according to an example arrangement. Referring to FIGS. 1A-1B, as described in further detail herein, the system 101 facilitates the generation, acceptance, and authentication of a request for cash from multiple customers (e.g., the customers 107A-107D) of the provider institution. As shown, the system 101 includes a provider computing system 102 communicably and operatively coupled with the cash container device 140, the customer user device 106A, and the unmanned vehicle 104 over a network 114. The network 114 provides communicable and operative coupling between the provider computing system 102, the cash container device 140, the customer user device 106A, other customer user devices (e.g., the customer user devices 106B-106D), the unmanned vehicle 104, and other components disclosed and described herein to provide and facilitate the exchange of communications (e.g., data, instructions, messages, values, commands, signals, and so on). Accordingly, the network 114 may include any network including wired (e.g., Ethernet), cellular data networks (e.g., mobile phone network), and/or wireless networks (e.g., 802.11X, ZigBee, Bluetooth, WiFi). In some arrangements, the network 114 includes the Internet. In other arrangements, the network 114 includes a proprietary banking network to provide secure or substantially secure communications between the provider computing system 102, the unmanned vehicle 104, the cash container device 140, and the customer user devices 106A-106D.

The provider computing system 102 is operated by a provider or a provider institution, which is an entity that facilitates various types of transactions between the customer user devices 106A-106D, the unmanned vehicle 104, and various other entities not explicitly described or shown herein. The provider institution may be a bank, credit union, a payment services company, or other similar entities. The provider computing system 102 includes, among other systems, a network interface circuit 116 enabling the provider computing system 102 to exchange data over the network 114 and a processing circuit 118.

The network interface circuit 116 includes program logic that facilitates connection of the provider computing system 102 to the network 114. The network interface circuit 116 supports communication between the provider computing system 102 and other systems, such as the cash container device 140, the customer user device 106A, and the unmanned vehicle 104. For example, the network interface circuit 116 includes a cellular modem, a Bluetooth transceiver, a Bluetooth beacon, and so on. In some arrangements, the network interface circuit 116 communicates via a secure wired connection within a branch of a provider (e.g., a financial institution) associated with the provider computing system 102. In some arrangements, the network interface circuit 116 includes the hardware and machine-readable media sufficient to support communication over multiple channels of data communication. Further, in some arrangements, the network interface circuit 116 includes cryptography capabilities to establish a secure or relatively secure communication session with the provider computing system 102, the unmanned vehicle 104, the cash container device 140, the customer user device 106A, and other user devices of customers not explicitly shown in FIG. 1B. In this regard, financial data (and/or other types of data) may be encrypted and transmitted to prevent or substantially prevent the possibility of hacking system 101 to access the financial data of the provider institution associated with the provider computing system 102.

The processing circuit 118 includes a processor 120 and memory 122. The processor 120 may be implemented as one or more application specific integrated circuits (ASICs), field programmable gate arrays (FPGAs), a group of processing components, or other suitable electronic processing components. The memory 122 may be one or more devices (e.g., RAM, ROM, Flash memory, hard disk storage) for storing data and/or computer code for completing and/or facilitating the various processes described herein. The memory 122 may be or include non-transient volatile memory, non-volatile memory, and non-transitory computer storage media. The memory 122 may include database components, object code components, script components, or any other type of information structure for supporting the various activities and information structures described herein. The memory 122 may be communicably coupled to the processor 120 and include computer code or instructions for executing one or more processes described herein.

The provider computing system 102 includes a cash request processing circuit 124 configured to manage, generate, transmit, and evaluate requests for cash from the online cash delivery application. Accordingly, the cash request processing circuit 124 is communicatively coupled to the unmanned vehicle 104, the cash container device 140, the customer user device 106A, and other user devices of customers (e.g., the customer user devices 106B-106D). The cash request processing circuit 124 can be configured to receive a request to generate a cash delivery for an amount of cash to be withdrawn from a cash container (e.g., the cash container device 140) and instruct an unmanned vehicle (e.g., the unmanned vehicle 104) to carry out the delivery to the customers 107A-107D. The cash container device 140 may be a storage container for cash, such as a cash lockbox, or may be a different type of cash dispenser machine, such as but not limited to, a portable Automated Teller Machine (ATM), or any other machine associated with the provider institution that dispenses cash. For example, the cash container device 140 may be a cash lockbox structured to facilitate a transaction, for example, a withdrawal or currency exchange. In some arrangements, the cash lockbox includes a camera, a sensor and a locking mechanism. In some arrangements, the cash lockbox has an ATM-like device inside of it to facilitate dispensing cash. The device may be connected to a repository of cash or each cash lockbox may store the cash within itself, being through other automated mechanisms. In other arrangements, the cash lockbox may contain open space from which a user can remove currency (e.g., the cash lockbox may be similar to a locker). The cash lockbox may be configured to incorporate various passcode options and a variety of input devices. In some arrangements, the outside of the cash lockbox has a biometric sensor, a card reader, a keypad, a bar code sensor, a fob sensor, or the like. In some arrangements, the passcode options available to the customers 107A-107D are limited to the available lockbox authentication devices on the cash lockboxes in or attached to the unmanned vehicle 104.

Figure 4:
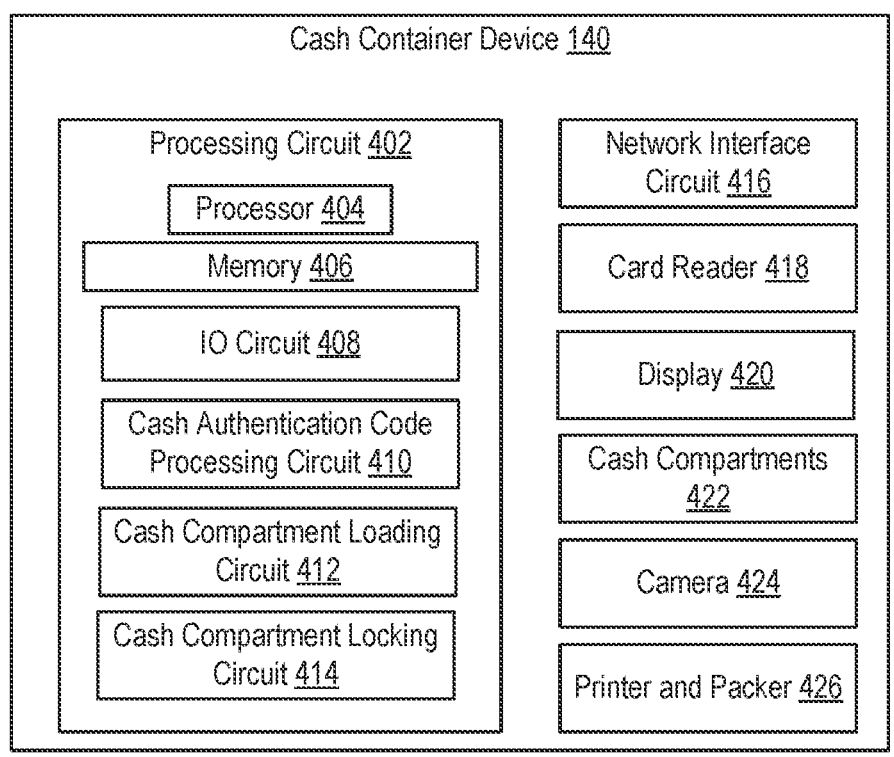
FIG. 4 is a block diagram of a cash container device that can be used in the system of FIGS. 1A and 1B, according to various arrangements.

As described herein, the cash request processing circuit 124 receives a signal indicating a request for cash to be delivered (e.g., from the customer user device 106A), generates the cash delivery request with information on where the customer 107A currently is located based on location data (e.g., GPS data) received from the customer user device 106A, how much cash is being requested, a calculated path (e.g., the flight path 105) to deliver the cash, and transmits the processed cash delivery request to the unmanned vehicle 104. In some arrangements, the cash request processing circuit 124 is configured to receive data from a customer account database 134, a cash containers circuit 126, and a CAC circuit 128 in order to finish processing the cash delivery request from customer user devices 106A-106D. For example, the cash delivery request can use acquired data from the cash containers circuit 126 on which cash containers (e.g., the cash container device 140) in, or being carried as a load by, the unmanned vehicle 104 have enough available cash to fulfill the requested amount of cash. Further, the CAC circuit 128 can generate CACs for authentication of each of the customers 107A-107D to whom the unmanned vehicle 104 is delivering cash and/or the customer user devices 106A-106D by the cash container device 140. The CACs can be sent to the customer user devices 106A-106D and/or the cash container device 140. For example, the CAC circuit 128 may generate a QR code or a bar code. The cash container device 140 may receive the QR code or the bar code from the provider computing system 102 and display the QR code or the bar code via a display 420 (FIG. 4) for a customer user device (e.g., the customer user device 106D) to scan. In other arrangements, a camera 424 (FIG. 4) of the cash container device 140 may scan the generated CAC. The generated CACs such as, but not limited to, QR code or bar codes, may be sent to the customer user devices 106A-106D and displayed on the screen of the customer user devices 106A-106D. The generated CACs may be scanned or input at the cash container device 140 in order to authenticate the customer user devices 106A-106D before unlocking one of the corresponding compartments of the cash container device 140 to dispense the cash therein.

The provider computing system 102 further includes a cash containers circuit 126, in some examples. The cash containers circuit 126 may be configured to manage data regarding various cash containers (e.g., the cash container device 140) associated with the provider institution. In some arrangements, the cash container device 140 is a portable ATM, cash locker, cash lockbox or any other machine that has the input and output capabilities to store and/or dispense cash to the customers 107A-107D of the provider institution in separate, individual compartments. The separate compartments of the cast container device 140 may be individually and independently locked and/or opened by the provider computing system 102. In various examples, the cash containers circuit 126 tracks data on the available funds of each cash container device 140 currently being used to complete cash delivery requests, any fees charged for withdrawing cash from the cash container device 140, the current location of each cash container device 140, and the functionality of each cash container device 140 (e.g., whether the cash container device 140 has operable input/output (IO) devices, cash compartments, display, printer and packer, etc.). The cash containers (e.g., the cash container device 140) associated with the provider institution may have a GPS location that can be tracked by the cash containers circuit 126, or can be connected to network 114 and tracked using WiFi triangulation.

The provider computing system 102 is shown to include an unmanned vehicle circuit 130. The unmanned vehicle circuit 130 may be configured to send instructions to the unmanned vehicle 104 on the flight path 105 to follow for delivering each of the several cash delivery requests to the customers 107A-107D in various locations. In some arrangements, the unmanned vehicle circuit 130 of the provider computing system 102 updates the flight path 105 of the unmanned vehicle 104 in response to receiving updated location data on the customer user devices 106A-106D from the location tracking circuit 132. In other arrangements, the unmanned vehicle circuit 130 generates a new flight path 105 for the unmanned vehicle 104 in response to determining that the unmanned vehicle 104 remains grounded at a base station. The unmanned vehicle circuit 130 may transmit instructions to the network interface circuit 218 (FIG. 2) of the unmanned vehicle 104 to return to the base station in response to the unmanned vehicle 104 having an amount of operation time lower than a threshold amount (e.g., the remaining possible flight time before the battery dies is below an hour). In some examples, the unmanned vehicle circuit 130 may change the flight path 105 of the unmanned vehicle 104 in response to detecting an attempt by the customers 107A-107D to tamper with the unmanned vehicle 104. Similarly, the unmanned vehicle circuit 130 may alter the flight path 105 or speed of the unmanned vehicle 104 in response to repeated (e.g., two or more) failed attempts to authenticate a customer or customer user device at a drop-off location.

Additionally, the provider computing system 102 includes a location tracking circuit 132. In various arrangements, the location tracking circuit 132 receives location data from the location position sensor 312 (FIG. 3) of each of the customer user devices 106A-106D via the network 114 to track the current location of the customer user devices 106A-106D. The location of the unmanned vehicle 104 can also be tracked by the location tracking circuit 132 using data received from sensors 220 (FIG. 2) of the unmanned vehicle 104. In some arrangements, the location tracking circuit 132 communicates the current position of the unmanned vehicle 104 and the customer user devices 106A-106D that have ongoing cash delivery requests to CAC circuit 128. The CAC circuit 128 may then use the location information received during the authentication stage when the customer picks up the cash from the cash container device 140 of the unmanned vehicle 104. For example, the provider computing system 102 may not authenticate the customer user device 106A and unlock a cash compartment, even if a correct CAC is presented, when the unmanned vehicle 104 is at the "STOP A" 108 and the location of the customer user device 106A is found to be over a predetermined distance (e.g., over 10 feet) from the current location of the unmanned vehicle 104.

The provider computing system 102 further includes a customer account database 134 which can be configured to store a plethora of information regarding customers of the provider institution. In some arrangements, the customer account database 134 contains user profiles, personal information (e.g., names, nicknames, addresses, pictures, personal preferences, etc.), transaction history, account data, and other data the provider institution collects and saves regarding customers. For example, a customer may have a personal preference for a delivery agent they want to deliver the cash request (e.g., the customer 107A only wants to have a drone deliver the cash because the customer 107A is sick), which can be stored in the customer account database 134. The customer account database 134 can store account information relating to accounts held by the customers 107A-107D with the provider institution. In some examples, the customer account database 134 is accessed to determine a bank account number of the customer 107A in response to the cash request processing circuit 124 generating the processed cash delivery request. In some examples, the customer account database 134 stores information (received from the location tracking circuit 132) on the current GPS locations of the customer user devices 106A-106D.

The provider computing system 102 is additionally shown to include a cash container database 136, which can be configured to store information on the current location of the cash container device 140 and other cash container devices, the amount of cash available to use in cash delivery requests for the cash container device 140, the functioning of the IO devices of the cash container device 140, etc. For example, the cash container database 136 may include data on whether the card reader 418 (FIG. 4) and the display 410 (FIG. 4) are operating correctly or have failed recently during a delivery. Furthermore, the provider computing system 102 may include an unmanned vehicle database 138. The unmanned vehicle database 138 may be configured to save a variety of data on the unmanned vehicle 104 and other unmanned vehicles being operated by the provider computing system 102. For example, the unmanned vehicle database 138 includes information on the model and year the unmanned vehicle 104 was made, the number of delivery trips the unmanned vehicle 104 has successfully completed, a current power level of a battery for the unmanned vehicle 104, any detected faults or problems with the unmanned vehicle 104, the location of the base station for the unmanned vehicle 104, and so on. In some arrangements, the unmanned vehicle database 138 is continuously updated with the tracked location of each unmanned vehicles receiving instructions from the location tracking circuit 132.

The system 101 is also shown to include the customer user device 106A, which is a computing device for the customer 107A. The other customer user devices 106B-106D, while not explicitly shown in FIG. 1B, may also be connected to the system 101 and are similar in structure to the customer user device 106A. The customer user device 106A includes any type of computing device that is used to interact with online applications and/or receive information from the provider computing system 102, the cash container device 140, and/or the unmanned vehicle 104. In some arrangements, the customer 107A uses the customer user device 106A to communicate information to both the provider computing system 102 over the network 114 and to the unmanned vehicle 104. In this regard, the customer user device 106A may include any wearable or non-wearable device. Wearable devices refer to any type of device that an individual wears including, but not limited to, a watch (e.g., a smart watch), glasses (e.g., eye glasses, sunglasses, smart glasses), bracelet (e.g., a smart bracelet), etc. The customer user device 106A may also include any type of mobile device including, but not limited to, a phone (e.g., a smart phone), table, personal digital assistant, and/or computing devices (e.g., a desktop computer, a laptop computer, a personal digital assistant).

The system 101 is also shown to include the cash container device 140. In general, the cash container device 140 is a computing system structured to provide an interface between the customers 107A-107D and the provider computing system 102, allowing the customers 107A-107D to retrieve the withdrawn cash when the unmanned vehicle 104 arrives at the location of each of the respective ones of the customer user devices 106A-106D. In various arrangements, the cash container device 140 is configured to allow a user not associated with a bank account (e.g., a checking account being used to withdraw from) to pick up cash withdrawn from the account in response to authenticating the user and/or a user device of the user. The authentication of the user and/or user device of the user may indicate the user not associated with the bank account is retrieving the cash on behalf of one of the customers 107A-107D.

Figure 2:
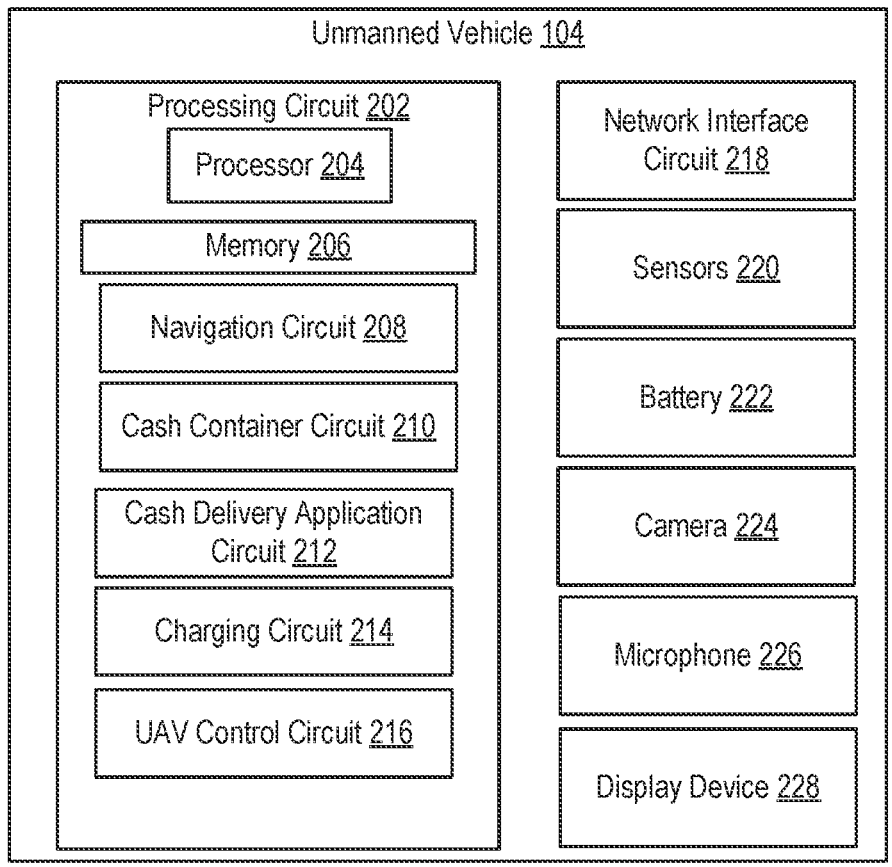
FIG. 2 is a block diagram of the unmanned vehicle that can be used in the system of FIGS. 1A and 1i, according to various arrangements.

Referring to FIG. 2, a depiction of the unmanned vehicle 104 that can be used in the system of FIGS. 1A and 1B is shown, according to various arrangements. Although the unmanned vehicle 104 is illustrated and described as a UAV, the unmanned vehicle 104 can also be other unmanned robotic vehicles. For example, but not restricted to, the unmanned vehicle 104 may be a type of unmanned land vehicles (ULVs), unmanned surface vehicles (USVs), UGV, unmanned underwater vehicles (UUVs), and so forth. In various arrangements, the unmanned vehicle 104 may be a non-combat, miniature drone. In several arrangements, the unmanned vehicle 104 may be any appropriate type of UAV that may carry the cash container device 140 as a load or inside the UAV. The unmanned vehicle 104 is shown in FIG. 1A as a quadcopter UAV, with four propellers and motors affixed to the frame of the unmanned vehicle 104. In other arrangements, the unmanned vehicle 104 may be a tricopter UAV with three propellers connected to the three motor units, a hexacopter UAV with six propellers connected to the six motor units, etc. The unmanned vehicle 104 includes a network interface circuit 218 enabling the unmanned vehicle 104 to exchange information over the network 114, a processing circuit 202, and various IO devices (e.g., sensors 220, a camera 224, a microphone 226, and a display device 228). In some arrangements, the network interface circuit 218 is the same as the network interface circuit 416 (FIG. 4) of the cash container device 140. The processing circuit 202 is shown to include a processor 204 and memory 206. The processing circuit 202, processor 204, and memory 206 may be the same or similar as the processing circuit 118, processor 120, and memory 122 respectively described with reference to the provider computing system 102. The unmanned vehicle 104 receives instructions from the provider computing system 102 on the location of the deliveries to the customers 107A-107D and the flight path 105 the unmanned vehicle 104 takes to deliver the multiple payloads (i.e., the cash delivery requests). As such, the processing circuit 202 of the unmanned vehicle 104 is communicably and operatively coupled to the provider computing system 102.

The network interface circuit 218 of the unmanned vehicle 104 is adapted for and configured to establish a communication session via the network 114 between the unmanned vehicle 104 and other systems, such as the provider computing system 102, the cash container device 140, and the customer user devices 106A-106D). Accordingly, the network interface circuit 218 includes any of a cellular transceiver (Code Division Multiple Access (CDMA), Global System for Mobile Communications (GSM), Long-Term Evolution (LTE), a wireless network transceiver (e.g., 802.11X, ZigBee, Bluetooth), or a combination of transceivers (e.g., a cellular transceiver, NFC transceiver, and a Bluetooth transceiver). In various arrangements, the network interface circuit 218 is configured to receive and send position information of the unmanned vehicle 104 to servers, controllers, access points, etc. and other components within and outside of the provider computing system 102. The network interface circuit 218 may be the same or similar as the network interface circuit 116 previously described with reference to the provider computing system 102.

The unmanned vehicle 104 is shown to include a navigation circuit 208. In some arrangements, the navigation circuit 208 receives communications via the network 114 from the provider computing system 102 on directions for a delivery path (e.g., the flight path 105) of the unmanned vehicle 104. The navigation circuit 208 may receive and process information on the current position of the unmanned vehicle 104, locations of stopping points (e.g., the "STOP A" 108, the "STOP B" 110, and the "STOP C" 112), flight paths (e.g., the flight path 105), locations of obstacles, altitudes, locations of charging stations, locations of the base station for the unmanned vehicle 104, and so on. In various examples, the navigation circuit 208 sends instructions to change the position and/or orientation of wheels and/or wings of the unmanned vehicle 104 in response to receiving instructions from the provider computing system 102 for the unmanned vehicle 104 to land and/or change direction on the flight path 105. As such, the navigation circuit 208 may be communicably and operatively coupled to the UAV control circuit 216, described herein. The navigation circuit 208 may also receive location data from the sensors 220 to transmit to the location tracking circuit 132 of the provider computing system 102 on the real-time position of the unmanned vehicle 104. In various arrangements, the navigation circuit 208 uses information from the IO devices (e.g., the sensors 222, the camera 224, the microphone 226, and so on) of the unmanned vehicle 104 to avoid unexpected obstacles encountered on the flight path 105. The camera 224 may include a photographic camera, a video camera, a thermal camera, etc., which may be used to prevent collisions between the unmanned vehicle 104 and objects (e.g., trees, buildings, people, etc.) encountered during the delivery path (e.g., the flight path 105). The camera 224 may also be used to scan or capture images of CACs on the customer user devices 106A-106D and to confirm biometrics of the customers 107A-107D retrieving cash from the cash container device 140. The sensors 220 may include proximity sensors, GPS sensors, a Light Imaging Detection and Ranging (LIDAR) device, force sensors for sensing pressure on the display screen 228, ambient sensors that detect surrounding conditions (e.g., sound sensors, light detectors, the microphone 226, other sound detectors, and so on) and biometric sensors (e.g., fingerprint readers, a heart monitor that detects cardiovascular signals, an iris scanner, a face scanner, and so forth). The unmanned vehicle 104 is also shown to include microphone 226. In various arrangements, the microphone 226 is used to detect ambient sounds to aid the unmanned vehicle 104 in successfully navigating to each of the locations of the customer user devices 106A-106D without any collisions or problems. The microphone 226 may also be used to authenticate the customers 107A-107D when the unmanned vehicle 104 is at the drop-off location, with the input of voice data sent to the provider computing system 102 to perform vocal recognition tests. The display device 228 may be a display screen for the unmanned vehicle 104 that provides information on the current delivery trip for the unmanned vehicle 104 and the conditions of the unmanned vehicle 104 (e.g., the power level of the battery 222, the amount of time since the unmanned vehicle 104 returned to a UAV base, the number of the multiple cash delivery requests successfully delivered on the current trip, the unmanned vehicle 104's next stop, such as the "STOP C" 112, and so on).

In various arrangements, the unmanned vehicle 104 includes a cash delivery application circuit 212. The cash delivery application circuit 212 may be configured to receive data from the provider computing system 102 on the details of multiple cash delivery requests. The details of the multiple cash delivery requests may be for requests that the unmanned vehicle 104 is in the process of delivering or will deliver after the cash compartments 422 (FIG. 4) are loaded for the corresponding cash delivery requests. In some arrangements, the cash delivery application circuit 212 is communicatively coupled to the network interface circuit 218 and the display device 228 in order to receive information on the cash delivery requests (e.g., the order of delivery for the multiple cash delivery requests, the names of the customers 107A-107D for the cash delivery requests, the type of CAC that the provider computing system 102 generated for verification, instructions for accepting authentication from the customers 107A-107D and/or the customer user devices 106A-106D, etc.) from the provider computing system 102. The information on the cash delivery requests may be displayed via the display device 228 to the customers 107A-107D when the unmanned vehicle 104 arrives at a drop-off location.

The unmanned vehicle 104 is also shown to include a cash container circuit 210 in some arrangements. The cash container circuit 210 may be configured to communicate to the UAV control circuit 216 to operate the machinery of the unmanned vehicle 104 to pick up or release the cash container device 140 in arrangements where the cash container device 140 is carried by the unmanned vehicle 104 as a load. As such, the cash container circuit 210 may be communicably and operatively coupled to the cash container device 140. In other arrangements, the cash container device 140 may be carried inside the unmanned vehicle 104. In these arrangements, the cash container circuit 210 may instruct a locked compartment of the unmanned vehicle 104 to unlock in response to landing at a drop-off location or to unlock at the end of the delivery trip. At the end of the delivery trip, each of the multiple cash delivery requests has been delivered and the unmanned vehicle 104 may return to the location of the base of the unmanned vehicle 104 (e.g., a UAV base) to recharge and load more cash for a new delivery trip. In some examples, the cash container circuit 210 may determine when the unmanned vehicle 104 may depart for a next drop-off location for one of the multiple cash delivery requests. The cash container circuit 210 may use information received from the cash compartment locking circuit 414 on whether the cash compartments 422 are all closed and locked before the unmanned vehicle 104 departs from a base and/or drop-off location.

Additionally, the unmanned vehicle 104 may include a charging circuit 214. In some arrangements, the charging circuit 214 is configured to determine the power level remaining for the battery 222 and the amount of time the unmanned vehicle 104 may continue to operate using the battery 222. The information determined by the charging circuit 214 may then be sent to the provider computing system 102 in order to determine whether the unmanned vehicle 104 can successfully complete the several cash deliveries before a return trip to a base to recharge is necessary. The charging circuit 214 may also be configured to recharge the battery 222 of the unmanned vehicle 104 when the unmanned vehicle 104 returns to a base after delivering the multiple cash delivery requests. The charging circuit 214 may also determine what IO devices of the unmanned vehicle 104 receive power from the battery 222. For example, if the power level in the battery 222 is lower than a threshold amount, the charging circuit 214 may direct the battery 222 to stop powering the microphone 226. In some arrangements, in response to the charging circuit 214 recharging the battery 222, the cash compartment locking circuit 414 may open all of the cash compartments 422 of the cash container device 140 to be simultaneously loaded as the unmanned vehicle 104 charges. As such, time is not wasted waiting for the unmanned vehicle 104 to recharge until enough power is available to complete another round trip delivery to multiple customers. In various arrangements, the battery 222 may be a rechargeable lithium polymer battery. Although the current disclosure presents the unmanned vehicle 104 containing a battery to use for power, the disclosure herein is also meant to encompass other arrangements for powering the unmanned vehicle 104, such as fuel-powered engines.

In some arrangements, the unmanned vehicle 104 includes a UAV control circuit 216. In various arrangements, the UAV control circuit 216 is configured to operate the mechanical components of the unmanned vehicle 104, such as wheels, wings, motors, landing gear, loading gear (e.g., to secure the cash container device 140 to the unmanned vehicle 104), cameras, other IO devices, etc. in order to change the direction, orientation, position, speed, etc. and carry out the other functions of the unmanned vehicle 104. In some arrangements, the UAV control circuit 216 may receive instructions on how to operate the mechanical components of the unmanned vehicle 104 from the navigation circuit 208 or directly from the provider computing system 102. Various detailed aspects of the unmanned vehicle 104, for example, the build of the frame, electrical components, the functioning of mechanical components, and other aspects known to one of ordinary skill in the art, are omitted for simplification of the depiction and description of the unmanned vehicle 104.

Figure 3:
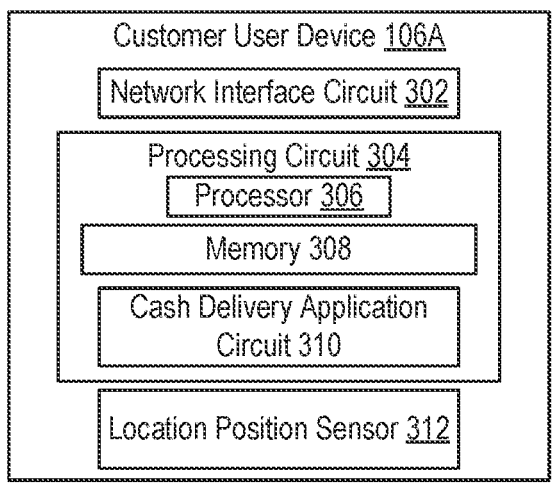
FIG. 3 is a block diagram of a customer user device of a customer that can be used in the system of FIGS. 1A and 1B, according to various arrangements.

Referring now to FIG. 3, an example block diagram of a customer user device of a customer that can be used in the system of FIGS. 1A and 1B is shown, according to some arrangements. The customer user device 106A may be the same or similar as the customer user devices 106B-106D. The customer user device 106A includes a network interface circuit 302 enabling the customer user device 106A to exchange information over the network 114, a processing circuit 304, and a location position sensor 312 in the example arrangement of FIG. 3. The processing circuit 304 is shown to include a processor 306 and memory 308. The processing circuit 304, processor 306, and memory 308 may be the same or similar as the processing circuit 118, processor 120, and memory 122 respectively described with reference to the provider computing system 102.

The network interface circuit 302 of the customer user device 106A is adapted for and configured to establish a communication session via the network 114 between the customer user device 106A and other systems, such as the provider computing system 102, cash container device 140, and the unmanned vehicle 104. Accordingly, the network interface circuit 302 includes any of a cellular transceiver (CDMA, GSM, LTE, a wireless network transceiver (e.g., 802.11X, ZigBee, Bluetooth), or a combination of various transceivers (e.g., a cellular transceiver, a NFC transceiver, and a Bluetooth transceiver). In some arrangements, the network interface circuit 302 communicates via a secured wired connection within a branch of the provider associated with the provider computing system 102. The network interface circuit 302 may be the same or similar as the network interface circuit 116 previously described with reference to the provider computing system 102.

The cash delivery application circuit 310 is structured to provide displays to the customer user device 106A that enable the customer 107A to use an application to create cash delivery requests for the provider institution. Accordingly, the cash delivery application circuit 310 is communicably and operatively coupled to the provider computing system 102. In some arrangements, the cash delivery application circuit 310 may be incorporated with an existing application in use by the provider institution (e.g., a mobile banking application or a mobile wallet application) or may be incorporated with an existing third-party application (e.g., a mobile ride sharing application). In other arrangements, the cash delivery application circuit 310 may be downloaded by the customer user device 106A prior to its usage, hard-coded into the memory 308 of the customer user device 106A, or be a web-based interface application, which may be executed remotely from the customer user device 106A. In the latter instance, the user may have to log onto or access the web-based interface before usage of the application. Further, and in this regard, the cash delivery application circuit 310 may be supported by a separate computing system including one or more servers, processors, network interface circuits, etc. that transmit applications for use to the customer user device 106A. In certain arrangements, the cash delivery application circuit 310 includes an API and/or a software development kit (SDK) that facilitate the integration of other applications with the cash delivery application circuit 310.

In various arrangements, and as will be described in greater detail with the various use-case scenarios below, the cash delivery application circuit 310 is configured to present to the customer 107A of the provider institution an application to send and receive requests for a cash delivery via a user interface of the customer user device 106A. In such arrangements, the cash delivery application circuit 310 is communicatively coupled to the network interface circuit 302 and the location position sensor 312 of the user device in order to transmit the cash delivery request to the provider computing system 102. The cash delivery application circuit 310 may be configured to track the position of the customer user devices 106A using data acquired from the location position sensor 312. Using the location information received from one or more unmanned vehicles (e.g., the unmanned vehicle 104) and the bases for each unmanned vehicle associated with the provider institution, the provider computing system 102 may determine which unmanned vehicle 104 to have deliver the cash request from the customer user device 106A. The provider computing system 102 may determine which unmanned vehicle 104 should make the delivery by calculating the distance between the location of the customer user device 106A and the location of the one or more unmanned vehicles. In some arrangements, the cash delivery application circuit 310 presents the customer 107A with several options to send, cancel, and/or edit a cash delivery request and view further details on the progress of the delivery after the cash delivery request is sent. For example, the customer 107A is presented with one or more options including, but not limited to, selecting which account to withdraw the cash from, selecting an amount of cash to withdraw, entering bill preferences for the cash delivery request, sending the cash delivery request, viewing nearby UAV drop-off locations, viewing requested cash delivery information, and tracking delivery progress on each of the customer user device 106A of the customer 107A. In another example, the cash delivery application circuit 310 may present the option via the customer user device 106A to change the type of delivery agent that delivers the cash delivery request (e.g., the option to choose between a driver as the delivery agent, an unmanned vehicle, and/or whichever option is the quickest).

The location position sensor 312 of the customer user device 106A is structured to receive location data and determine a location or receive information indicative of a location of the customer user device 106A. In one arrangement, the location position sensor 312 includes a GPS or any other type of location position system. As such, the location position sensor 312 receives latitude data, longitude data, and other types of location or position data to determine the location of the customer user device 106A. In other arrangements, the location position sensor 312 receives an explicit location identification from the customer 107A of the customer user device 106A. All such variations are intended to fall with the spirit and scope of the present disclosure.

Referring now to FIGS. 1A-4, as shown, and for the purpose of clarity, the disclosure contained herein is in reference to a single cash container device 140 of the unmanned vehicle 104. This depiction is for illustrative purposes only to show an implementation environment of the systems and methods described herein. It should be understood that the provider computing system 102 may be communicably and operatively coupled with multiple cash containers that may have the same or similar characteristics as illustrated with the example arrangement of cash container device 140. The cash container device 140 is shown to include a network interface circuit 416 that facilitates connection of the cash container device 140 to the network 114. The network interface circuit 416 of the cash container device 140 is adapted for and configured to establish a communication session via the network 114 between the cash container device 140 and other systems, such as the provider computing system 102, the customer user devices 106A-106D, and the unmanned vehicle 104. Accordingly, the network interface circuit 416 includes any of a cellular transceiver (CDMA, GSM, LTE), a wireless network transceiver (e.g., 802.11X, ZigBee, Bluetooth), or a combination of various transceivers (e.g., both a cellular transceiver, a NFC transceiver, and a Bluetooth transceiver). In some arrangements, the network interface circuit 416 communicates via a secured wired connection within a branch of the provider institution associated with the provider computing system 102. The network interface circuit 416 may be the same or similar as the network interface circuit 116 previously described with reference to the provider computing system 102.

The cash container device 140 is also shown to include a processing circuit 402 including a processor 404 and memory 406. The processing circuit 402, processor 404, and memory 406 may be the same or similar as the processing circuit 118, processor 120, and memory 122 described respectively with reference to the provider computing system 102. The processing circuit 402, processor 404, and memory 406 may be incorporated in or shared with the unmanned vehicle 104. The cash container device 140 is shown to include an IO circuit 408, which may be configured to receive and provide communications to the customers 107A-107D at the cash container device 140 (or, to another entity such as the provider computing system 102). In this regard, the IO circuit 408 is structured to exchange data, communications, instructions, etc. with the customer user devices 106A-106D and/or the customers 107A-107D. Accordingly, in one arrangement, the IO circuit 408 communicates with IO devices such as a display device, a touchscreen, a keyboard, a microphone, a barcode scanner, and/or a quick response (QR) code scanner. In various arrangements, the IO circuit 408 includes communication circuitry for facilitating the exchange of data, values, messages, and the like between an IO device and the components of the cash container device 140. In some arrangements, the IO circuit 408 includes machine-readable media for facilitating the exchange of information between the IO device and the components of the cash container device 140. In still another arrangement, the IO circuit 408 includes any combination of hardware components (e.g., a touchscreen), communication circuitry, and machine-readable media.

The IO circuit 408 includes hardware structured to facilitate input of a CAC by scanning the CAC on a display of the customer user devices 106A-106D) and/or by manual input by the customers 107A-107D) or other user designated to retrieve the cash delivery request on behalf of the customers 107A-107D. In some arrangements, the IO circuit 408 includes a keypad structured to facilitate manual input of the CAC by the customers 107A-107D. For example, the customer 107A inputs a CAC of an alphanumeric code displayed on the customer user device 106A using a keypad of the cash container device 140. The IO circuit 408 may then receive the alphanumeric code from the keypad of the cash container device 140. In other arrangements, the IO circuit 408 includes a scanner configured to read the CAC (e.g., a one-time passcode, a QR code, a barcode, etc.), which can be presented to the scanner via a display screen of the customer user devices 106A-106D. For example, the customer 107A presents a QR code that is generated on an interface of customer user device 106A to a scanner and the IO circuit 408 processes the QR code read by the scanner. In some arrangements, the hardware provided by the cash container device 140 and connected with IO circuit 408 with which the customer 107A can input the CAC depends on the type (e.g., a one-time passcode, a QR code, barcode, alphanumeric, etc.) of CAC received by the customer user devices 106A-106D.

In various arrangements, the IO circuit 408 includes components, devices, and/or hardware to facilitate authorization of identification of one of the customers 107A-107D retrieving the cash delivery request. For example, the generated CAC can include authentication (e.g., biometric scan, facial recognition, PIN input, virtual ID card) to confirm the identification of the customer 107A for the specific cash delivery request made by customer 107A. As such, the IO circuit 408 includes one or more components, devices, and corresponding hardware to verify such identification of the customers 107A-107D. The types of components, devices, and hardware provided by the IO circuit 408 are configurable based on the structure of the cash container device 140 and/or the provider institution preference. For example, the provider institution favors requiring facial recognition of the customer 107A before one of the cash compartments 422 is opened and the cash is dispensed for the cash delivery request. Thus, based on the facial recognition preference, the IO circuit 408 includes a camera 424 and the corresponding hardware to facilitate a facial recognition process.

The cash container device 140 is also shown to include a CAC processing circuit 410, which can be configured to receive a CAC and transmit the CAC to the provider computing system 102 to determine whether to unlock one of the cash compartments 422 of the cash container device 140. In some arrangements, the CAC processing circuit 410 communicates with IO circuit 408 to receive CACs from the customer user devices 106A-106D and/or the customers 107A-107D. Accordingly, the CAC processing circuit 410 is communicably and operatively coupled to the IO circuit 408. In such arrangements, the CAC processing circuit 410 is configured to decipher data (e.g., the cash amount for the associated cash delivery request, identification requirements, etc.) from an entered CAC. In several arrangements, the CAC processing circuit 410 is configured to receive and decipher various types of codes in a unique CAC (e.g., a one-time passcode, a barcode, QR code, alphanumeric, etc.). The provider computing system 102 can generate a QR code, barcode, one-time passcode, etc. that is unique to the transaction (e.g., for the authentication at the cash container device 140 of the unmanned vehicle 104). In various arrangements, the CAC processing circuit 410 communicates with the CAC circuit 128 to validate the CAC in order to verify the correct one of the customers 107A-107D at the cash container device 140. As such, the CAC processing circuit 410 is also communicably coupled to the CAC circuit 128. For example, the CAC processing circuit 410 transmits a CAC to the CAC circuit 128 to decide, by the CAC circuit 128, if the particular CAC exists for a current, ongoing cash delivery request. Additionally, the CAC processing circuit 410 may communicate with the CAC circuit 128 of the provider computing system 102 to confirm identification of one of the customers 107A-107D to verify the customer has the authority to pick up the withdrawn cash. In some examples, in order for the cash container device 140 to unlock the corresponding cash compartment 422 storing the cash for the cash delivery request, the customer 107A enters a PIN displayed on an interface of the customer user device 106A. The CAC processing circuit 410 may receive the PIN and then may communicate the PIN to the provider computing system 102 to confirm whether the customer 107A has the correct identification (e.g., PIN) to withdraw cash. In other arrangements, one of the customers 107A-107D inserts an issued card from the provider institution into the card reader 418 of the cash container device 140. The CAC processing circuit 410 may then transmit the information from the inserted card to the provider computing system 102 to determine whether one of the customers 107A-107D is authorized or not to withdraw cash from the cash container device 140.

The cash container device 140 may also include a cash compartment loading circuit 412. In some arrangements, the cash compartment loading circuit 412 may receive instructions from the provider computing system 102 to unlock individual compartments of the several cash compartments 422. Accordingly, the cash compartment loading circuit 412 is communicably and operatively coupled to the cash compartment locking circuit 414, among other components of the cash container device 140. In various arrangements, the cash compartment loading circuit 412 receives information from the cash request processing circuit 124 on how each cash delivery request should be loaded into the cash container device 140. The cash for each cash delivery request the unmanned vehicle 104 will deliver on the trip may be loaded into the cash compartments 422 of the cash container device 140 in a predetermined manner. The predetermined manner may specify certain prioritization factors to help customers of the provider institution most in need. Such prioritization factors may include, but are not limited to, shortest distance to GPS locations of the customer user devices 106A-106D, amount of cash requested in each cash delivery request from one of the customer user devices 106A-106D, transaction history of the customers 107A-107D, etc. In some arrangements, transaction history comprises past payments, purchases, cash withdrawals, account balances, current loans, credit card statements, and so on. In various implementations, transaction history also includes medical history, and therefore the one of the customers 107A-107D experiencing stressful situations may receive a cash delivery request first, despite being further away from the base of the unmanned vehicle 104 than the other customers are. The customers 107A-107D experiencing life-changing events (e.g., birth, weddings, funerals, etc.) may also be prioritized more than other customers that would be prioritized if other factors were considered (e.g., greater amount of cash requested). The provider computing system 102 may instruct the cash container device 140 to open all the cash compartments 422 without any cash to load the cash compartments 422. In response to these instructions, the cash compartment loading circuit 412 may communicate to the cash compartment locking circuit 414 to open all the cash compartments 422.

The cash container device 140 is also shown to include a cash compartment locking circuit 414. In various arrangements, the cash compartment locking circuit 414 controls the locking and unlocking of the cash compartments 422 and the opening and closing of the cash compartments 422. The cash compartment locking circuit 414 may also be communicably and operatively coupled to the CAC processing circuit 410. In response to the provider computing system 102 verifying one of the customers 107A-107D and/or one of the customer user devices 106A-106D, the cash compartment locking circuit 414 may receive instructions from the CAC processing circuit 410 to unlock the one corresponding compartment of the cash compartments 422 that stores the cash for the cash delivery request from one of the customer user devices 106A-106D. In other arrangements, instead of the cash compartments 422 storing the cash that was loaded into the cash container device 140 locking and unlocking, the cash compartments 422 can dispense the cash directly to the customers 107A-107D. In this example, the printer and packer 426 may dispense a sealed envelope with cash for the cash delivery request packed inside and the name of one of the customers 107A-107D picking up the cash printed on a front surface of the sealed envelope. The cash compartment locking circuit 414 may communicate to the display 420 of the cash container device 140 a number of a compartment that is unlocked. The number of the compartment that is unlocked may be displayed to one of the customers 107A-107D at the drop-off location to notify them which of the cash compartments 422 has the cash to pick up.

The cash container device 140 can include a display 420 used to present customer information, transaction information, and the like to the customers 107A-107D while at the cash container device 140. In this regard, the display 420 is communicably and operatively coupled to the IO circuit 408 to provide a user interface for receiving and displaying information on the cash container device 140. Examples of user interfaces include digital screens, lights, voice instructions, etc. In various arrangements, the display 420 provides instructions (e.g., determined by the IO circuit 408, determined by the CAC processing circuit 410) to the customers 107A-107D for facilitating unlocking the corresponding cash compartments storing the cash for customers 107A-107D. For example, the display 420 presents an instruction to the customer 107A requesting that the customer 107A inputs a CAC or scans (via a scanner provided by the IO circuit 408) a CAC. In this regard, the display 420 may be configured to display information (e.g., customer profile details, cash delivery request details) correlating to the CAC entered by the customer 107A. In some arrangements, the IO circuit 408 is configured to send only information on the names of the customers 107A-107D and does not display any of the customers 107A-107D's financial data (e.g., customer account numbers or the amount of cash being withdrawn for each of the cash delivery requests).

The cash container device 140 may also include a cash dispenser for the IO devices configured to dispense a predetermined amount of cash to the customers 107A-107D at the cash container device 140. In this regard, the cash dispenser may be communicatively and operatively coupled to the IO circuit 408 and the CAC processing circuit 410 to dispense an amount of cash for the CAC. For example, after facial recognition of the customer 107A is completed via camera 424 and the CAC processing circuit 410 receives confirmation that the customer 107A is authenticated, the amount of cash specified in the cash delivery request by the customer 107A is dispensed. The cash container device 140 also includes a printer and packer 426 configured to operate with the cash dispenser to print envelopes, pack the dispensed cash within the envelopes, and seal the envelopes before dispensing to the customers 107A-107D.

Figure 5:
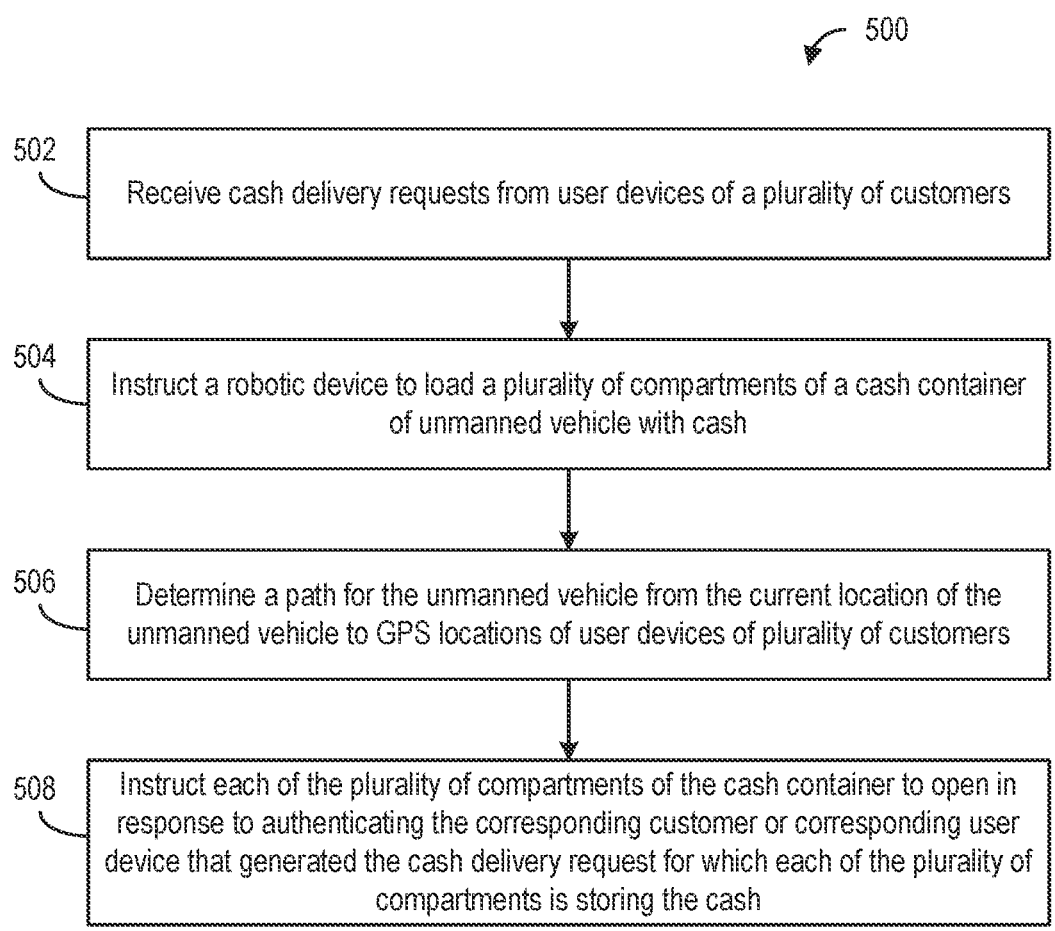
FIG. 5 is a flow diagram depicting a method for delivering cash by an unmanned vehicle with a cash container device to several customers, where the several customers are at different locations, according to various arrangements.

Referring now to FIG. 5, a flow diagram illustrating a method 500 for delivering cash by an unmanned vehicle to several customers (FIG. 1) is depicted, according to various arrangements. Referring to FIGS. 1A-5, the method 500 is performed by the provider computing system 102. At 502, the cash request processing circuit 124 may be configured to receive cash delivery requests from the customer user devices 106A-106D of a plurality of customers 107A-107D of the provider institution associated with the provider computing system 102. In some examples, the cash delivery requests are received from the customer user devices 106A-106D via a user interface such as, but not limited to, the user interface 700 (FIG. 7) of an online cash delivery application. Each of the cash delivery requests include information such as, but not limited to, the amount of cash the respective one of the customers 107A-107D desires (e.g., customer 107A wants $2000 in cash, whereas customer 107D indicates in the cash delivery request that only $100 is desired), the current GPS locations of the customer user devices 106A-106D, and personal preferences of each of the customers 107A-107D. For example, a specific UAV drop-off location may be specified by the customer 107C, the customer 107A may indicate cash is needed as soon as possible instead of preferring a lower fee for having the cash delivered, and the customer 107A may want the $2000 only in $20 bills, and so on. In some arrangements, once the cash delivery request is received, the provider computing system 102 may access the customer account database 134 to retrieve any additional information on the customers 107A-107D who made the request, such as but not limited to, past cash delivery requests, personal information, account information for the provider institution, and so on. The amount to withdraw specified in the cash delivery request may be tokenized by the cash request processing circuit 124. For example, in circumstances where the cash container device 140 displays information on the cash delivery request after the unmanned vehicle 104 lands at a drop-off location (e.g., the "STOP A" 108, the "STOP B" 110, or the "STOP C" 112).

At 504, the cash containers circuit 126 can be configured to instruct a robotic device to load a plurality of the cash compartments 422 of the cash container device 140 of the unmanned vehicle 104 with cash. In some arrangements, the cash containers circuit 126 may instruct the robotic device to load the cash compartments 422 of the cash container device 140 in a particular order based on a variety of factors for the cash delivery requests from the customer user devices 106A-106D. For example, the factors include optimized pathing for the unmanned vehicle 104 (e.g., minimizing the distance between the customer user devices 106A-106D and a base for the unmanned vehicle 104), the amount of cash in each cash delivery request, and the transaction history of the customers 107A-107D. As such, if transaction history of the customers 107A-107D is prioritized, the cash containers circuit 126 may instruct the cash delivery request for one of the customers 107A-107D undergoing a severe life event to receive the cash delivery request before the others. For example, the cash delivery request for the one customer experiencing the severe event may be loaded into one of the cash compartments 422 that will be unlocked first in response to successful authentication of the one of the customers 107A-107D and/or one of the customer user devices 106A-106D and delivered first. In other examples, the cash amount in the cash delivery request is prioritized. As such, the requests for greater amounts of cash may be loaded into one of the cash compartments 422 that will be unlocked and delivered first, in response to successful authorization, before the cash delivery requests that have lesser cash amounts. In various arrangements, the cash is counted by a bill counter as the cash for each cash delivery request is loaded automatically into the cash compartments 422 by the robotic device.

At 506, the cash request processing circuit 124 may be configured to determine the flight path 105 for the unmanned vehicle 104 from the current location of the unmanned vehicle 104 to the GPS locations of customer user devices 106A-106D. The flight path 105 for the unmanned vehicle 104 can be determined by locations of the customer user devices 106A-106D. In some arrangements, the flight path 105 for the unmanned vehicle 104 to deliver the cash to several customers is determined based on which path will have the quickest average delivery time to each one of the customers 107A-107D, which path covers the shortest distance to GPS locations of the customer user devices 106A-106D, how much money is requested by each one of the customer user devices 106A-106D, the transaction history of each of the customers 107A-107D making the request, or the demand for cash in the area surrounding the drop-off location. For example, the cash delivery request with the highest amount of cash may be the first stop made by the unmanned vehicle 104. In another example, the customer 107D may be experiencing a life-altering event, such as a severe medical emergency, and require cash immediately. As such, the flight path 105 for the unmanned vehicle 104 may stop first at the location of the customer user device 106D instead of the closer customer user devices 106A and 106B. In other arrangements, the flight path 105 for the unmanned vehicle 104 may be determined using information on the demand for cash at each GPS location of the customer user devices 106A-106D. For example, if the customer user device 106D is at a concert venue where a lot of customers are making a demand for cash, the unmanned vehicle 104 may stop at the GPS location of the customer user device 106D before the other stops. The demand for cash at locations of the customer user devices 106A-106D may be determined by the provider computing system 102 using data from social media posts, GPS locations of customer user devices currently operating the cash delivery mobile application, and/or the frequency of ATM withdrawals near the GPS locations of the customer user devices 106A-106D. In various arrangements, the flight path 105 may be determined based on a preference given by the customers 107A-107D in the cash delivery request. For example, the customer 107C, in making the cash delivery request, can specify whether the customer 107C prefers a lower bill for the cash delivery or prefers the cash delivery is completed as soon as possible. In some cases, there is no difference in cost for the cash delivery when the preference is that the delivery is completed as soon as possible. The cash request processing circuit 124 may calculate the flight path 105 for the unmanned vehicle 104 using data received from the location tracking circuit 132 on the locations of each of the customer user devices 106A-106D and the tracked position of the unmanned vehicle 104.

Figure 9:
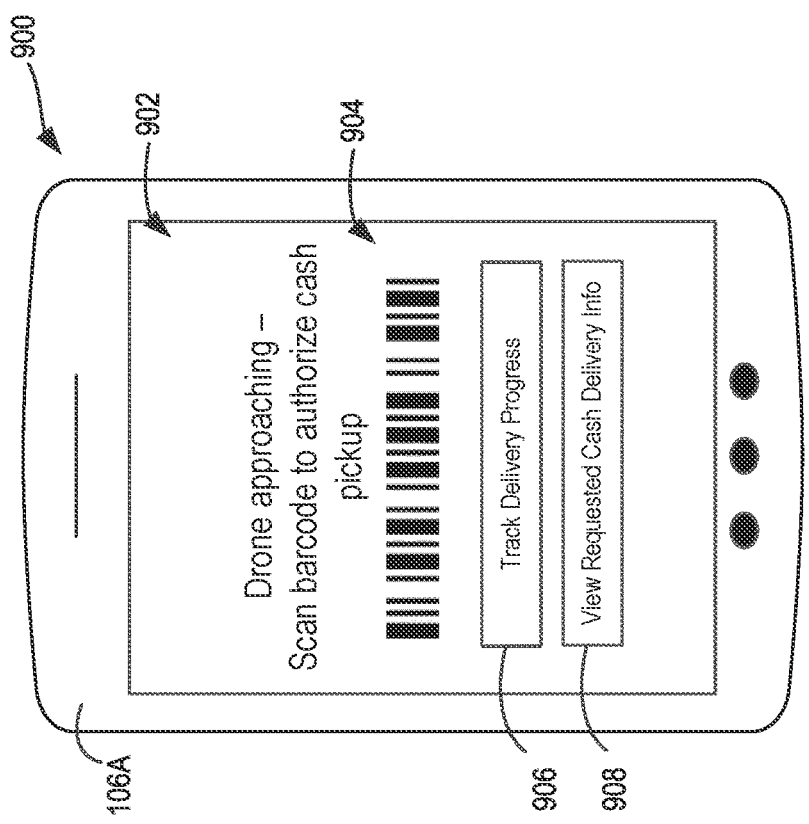
FIG. 9 is a schematic drawing depicting another example user interface of the customer user device used in the environment of FIG. 1 to authorize the cash delivery request, according to various arrangements.

At 508, the cash containers circuit 126 may be configured to instruct each of the plurality of the cash compartments 422 of the cash container device 140 to open in response to authenticating the corresponding customers 107A-107D or corresponding customer user devices 106A-106D that generated the cash delivery request for which each of the plurality of cash compartments 422 is storing cash. In some arrangements, each one of the customer user devices 106A-106D can be verified at the cash container device 140 by scanning the user interface of the respective customer user device of the customer, where the user interface is displaying or transmitting a CAC received from the provider computing system 102. In various arrangements, the CAC is displayed on the customer user devices 106A-106D, such as in user interface 900 (FIG. 9). In other examples, the customers 107A-107D are each verified by the provider computing system 102 using an image, a virtual identity card, biometric responses of the respective customer, or other security information of the respective one of the customers 107A-107D taken by the cash container device 140 and/or the unmanned vehicle 104. In response to the provider computing system 102 authenticating the corresponding one of the customers 107A-107D or corresponding one of the customer user devices 106A-106D that generated the cash delivery request, the compartment storing the cash for that specific cash delivery request may be unlocked. For example, in response to the customer 107C being authenticated at the "STOP B" 110, one of the cash compartments 422, storing the amount of cash requested by the customer 107C in the cash delivery request, may be unlocked by the cash compartment locking circuit 414. The other slots of the cash container device 140 can remain shut while the cash compartment storing the cash delivery request for the customer 107C is open. Each cash compartments 422 of the cash container device 140 may be configured to be unlocked and opened individually and independently by the provider computing system 102.

Figure 6:
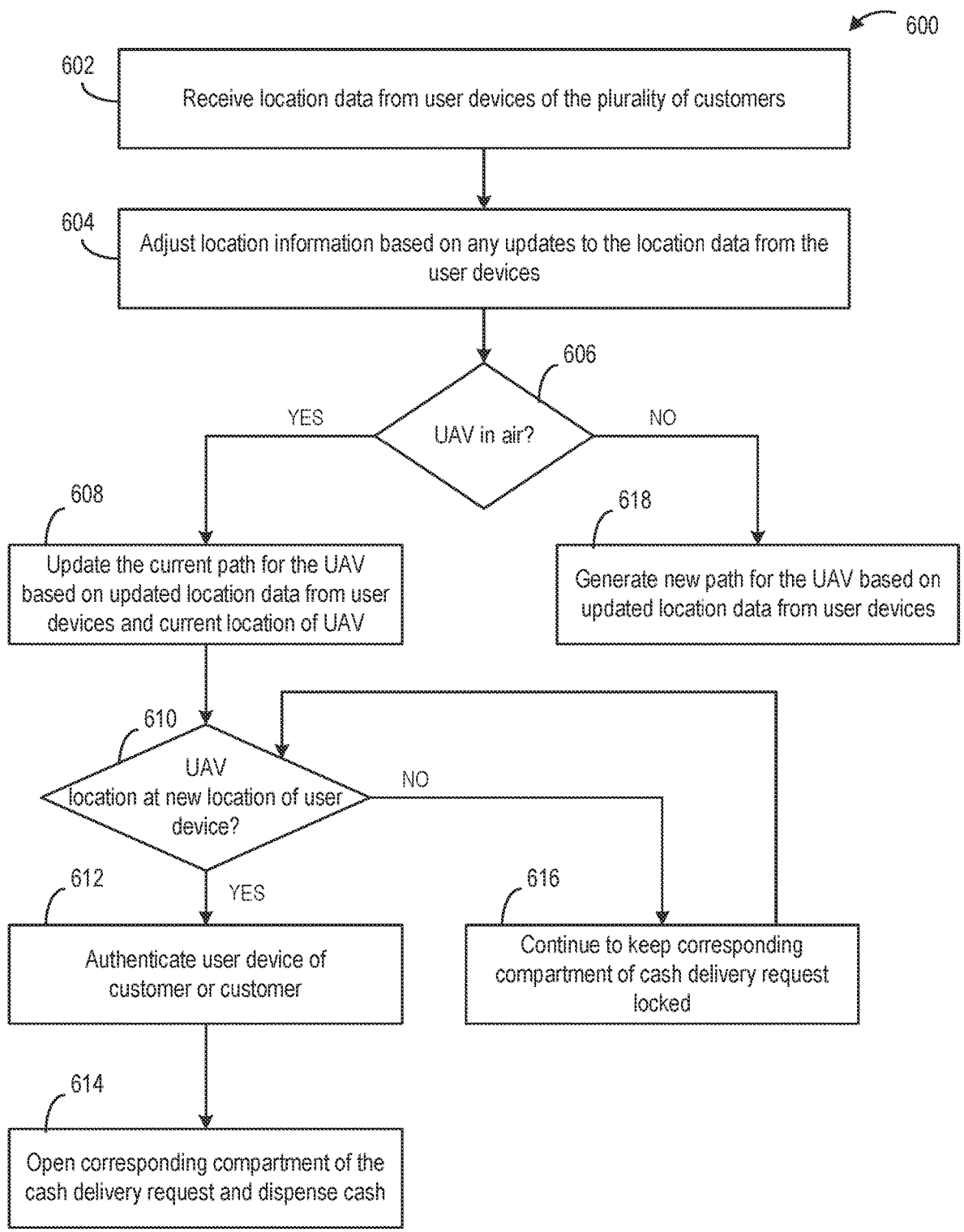
FIG. 6 is a flow diagram illustrating a method for delivering cash from a cash container to customers via an unmanned vehicle, according to various arrangements.

Referring now to FIG. 6, a flow diagram depicting a method 600 for delivering cash from a cash container to several customers by an unmanned vehicle is shown, according to various arrangements. Referring to FIGS. 1A-6, the method 600 is performed by the provider computing system 102. At 602, the location tracking circuit 132 may be configured to receive location data from the customer user devices 106A-106D. In various arrangements, the location data may include GPS data from the location position sensor 312 of each one of the customer user devices 106A-106D. The location tracking circuit 132 may further be configured to adjust location information of the customer user devices 106A-106D based on any updates to the location data from a location position sensor (e.g., the location position sensor 312) of each of the customer user devices 106A-106D (block 604). In some examples, the adjusted location information on the current positions of the customer user devices 106A-106D is stored in the customer account database 134 and/or the unmanned vehicle database 138 for when the unmanned vehicle 104 gets closer to each of the locations of the customer user devices 106A-106D.

At 606, the unmanned vehicle circuit 130 may be configured to determine whether the UAV (e.g., the unmanned vehicle 104) is currently in the air or whether the UAV is still landed at a base for the UAV or at a drop-off location completing a delivery. In some examples, the provider computing system 102 receives communications from the network interface circuit 218 of the unmanned vehicle 104 and the navigation circuit 208 of the unmanned vehicle 104 to determine the current location of the unmanned vehicle 104. The sensors 220 and the camera 224 may also be used by the provider computing system 102 to determine when the unmanned vehicle 104 takes off or whether the unmanned vehicle 104 has already taken off and is currently in flight on the flight path 105.

If at 606 it is determined that the UAV (e.g., the unmanned vehicle 104) is not currently in the air on the flight path 105, cash request processing circuit 124 may generate a new flight path for the UAV based on the updated location data from the customer user devices 106A-106D (block 618). The cash request processing circuit 124 may receive information on the current GPS locations of the customer user devices 106A-106D from the location tracking circuit 132 and the unmanned vehicle circuit 130. The generated new flight path for the unmanned vehicle 104 may include the same factors to prioritize for the previous flight path 105 of the unmanned vehicle 104. However, if at 606 it is determined that the unmanned vehicle 104 has taken off and is in the air currently, the cash request processing circuit 124 may be configured to update the current flight path 105 for the unmanned vehicle 104 based on updated location data from the customer user devices 106A-106D and the current location of the unmanned vehicle 104 (block 608). In various arrangements, the unmanned vehicle circuit 130 sends instructions to the unmanned vehicle 104 to change course and use new GPS locations of the customer user devices 106A-106D). For example, the customer 107C may decide to drive to the location of the "STOP C" 112 while the unmanned vehicle 104 is still on the flight path 105 between the "STOP A" 108 and the "STOP B" 110. In this example, the flight path 105 for the unmanned vehicle 104 may then be altered to change the direction of the unmanned vehicle 104 to head towards the "STOP C" 112 instead of landing at the "STOP B" 110. In this example, the "STOP B" 110 is the old location of the customer user device 106C and the "STOP C" 112 is the new, updated location of the customer user device 106C of the customer 107C.

At 610, the location tracking circuit 132 can be configured to determine whether the current UAV (e.g., the unmanned vehicle 104) location is at the new location of the user device of the customer (e.g., the customer user devices 106A-

106D) for one of the multiple cash delivery requests. In some arrangements, the location tracking circuit 132 compares information stored in the customer account database 134 of the current locations of the customer user devices 106A-106D to the locations saved in the unmanned vehicle database 138. The location information stored in both the customer account database 134 and the unmanned vehicle database 138 may be continuously updated when the provider computing system 102 receives new location data from the customer user devices 106A-106D via the network 114. In the previous example of the customer 107C, the new location of the customer user device 106C is the "STOP C" 112 instead of the "STOP B" 110. In various arrangements, the extent that the two different locations match may be determined by the provider computing system 102, such as the two current locations of the customer user device 106C and the unmanned vehicle 104 are within 10 feet of the other device. If it is determined that the unmanned vehicle 104's location matches the location of one of the customer user devices 106A-106D to a certain degree at 610, then the CAC circuit 128 may be configured to authorize one of the customer user devices 106A-106D or one of the customers 107A-107D (block 612). For example, if the provider computing system 102 determines the location of the customer user device 106C matches the location of the unmanned vehicle 104 within a certain distance (e.g., 5 feet, 10 feet, 50 feet, etc.), a CAC may be generated by the CAC circuit 128 and transmitted to the customer user device 106C to use at the cash container device 140. In some arrangements, the CAC is a QR code that the camera 224 of the cash container device 140 scans and transmits to the provider computing system 102. The provider computing system 102 then determines whether the scanned QR code matches the CAC sent to the customer user device 106C. In other examples, the customer 107C may provide a biometric response (e.g., a fingerprint, handprint, iris scan, image of the face) to the cash container device 140 via the camera 224 or other IO devices. The received biometric response may then be transmitted to the provider computing system 102 to determine whether the customer 107C has the correct authority to access one of the cash compartments 422 to retrieve cash.

On the other hand, if it is determined at 610 that the unmanned vehicle 104's location is not at the new location of the customer user device (e.g., the customer user device 106C), then the corresponding compartment of the cash compartments 422 may remain locked. The cash containers circuit 126 may be configured to continue to keep the corresponding compartment of the unique cash delivery request locked until the unmanned vehicle 104's location is the same as the new location of the customer user device (e.g., the customer user device 106C) (block 616). For example, if the provider computing system 102 determines that the current location of the unmanned vehicle 104 is at the "STOP B" 110 using the location data from the sensors 220, the cash containers circuit 126 will not instruct the cash compartment locking circuit 414 to open the compartment with cash for the customer 107C. After 616, the method 600 may continue back to 610 to determine again whether the unmanned vehicle 104 is at the new location of the customer user device 106C until the location of the unmanned vehicle 104 and the location of the customer user device 106C finally match.

At 614, the cash containers circuit 126 may be configured to open the corresponding compartment of the compartments 422 for the cash delivery request and dispense cash in response to one of the customer user devices 106A-106D or one of the customers 107A-107D being authorized in 612. In various arrangements, the cash compartments 422 each contain cash for a unique cash delivery request. In various arrangements, the unique compartment of the cash compartments 422 storing cash for each delivery request may only be unlocked and opened upon proper authentication of corresponding one of the customers 107A-107D and/or one of customer user devices 106A-106D that made the cash delivery request. In various arrangements, the other cash compartments 422 remain shut and unable to be accessed by other customers while one of the cash compartments 422 of the cash container device 140 is unlocked and opened. In the previous example given with respect to the customer 107C, upon authenticating the customer 107C and/or the customer user device 106C, the cash compartment locking circuit 414 may open the individual cash compartment of the cash compartments 422 that stores cash for the customer 107C. In some arrangements, the cash for the cash delivery request is stored in the cash compartments 422 like a locker. In other arrangements, the corresponding one of the cash compartments 422 may dispense the cash to the customers 107A-107D (e.g., similar to a portable ATM dispensing cash to a user).

Referring now to FIG. 7, an example user interface 700 of the customer user device 106A presenting the option to make a cash delivery request is shown, according to various arrangements. Referring to FIGS. 1A-7, the example user interface 700 is an example of an interface generated in response to the customer 107A choosing a selectable option on a mobile application (e.g., an online banking application) to request cash to be delivered. For example, an online banking application has options for customers 107A-107D to select "make a payment," "deposit a check," "view account balance," and "request cash delivery." In various arrangements, the example user interface 700 is generated via the cash delivery application circuit 310. The customer user device 106A includes a viewing area 702, where the customer 107A can select various options regarding the request for cash, input the amount of cash to withdraw for the cash delivery request, and input which account they want the cash withdrawn from for completing the cash delivery request. A cash withdraw directions 704 is presented to the customer 107A in the viewing area 702 of the display screen of the customer user device 106A. The user interface 700 includes an "amount to withdraw" input box 706, where the customer 107A can input the amount of cash they would like to have delivered. In some arrangements, the customer 107A can type in the amount of cash to request, or the customer 107A can choose from a selection of amount options (e.g., $20, $50, $100, $200). The user interface 700 can also provide an "account to withdraw from" input box 708. The customer 107A may select from the customer 107A's accounts linked to the provider institution (e.g., checking and savings accounts for an online banking application). In some arrangements, the "account to withdraw from" input box 708 has a drop down tab that displays each available account the customer 107A can choose from for the cash delivery request. In other arrangements, the customer 107A can enter a new bank account number or add a new account to save to the cash delivery application. The user interface 700 shows an "enter bill preference" selection option 710, a "send cash delivery request" selection option 712, and a "view nearby UAV drop-off locations" selection option 714.

Upon selection of the "enter bill preference" selection option 710, the customer 107A can be directed to enter how to withdraw the cash for the cash delivery request. For example, a pop up window is generated with the option to choose between $1, $5, 10, $20, $50, and $100 dollar bills, allowing the customer 107A to increase the amount for a specific one or more bills until the designated amount in the request is reached. Upon selection of the "send cash delivery request" selection option 712, the customer 107A completes the request for cash delivery. In response to the customer 107A selecting "send cash delivery request" selection option 712, the provider computing system 102 may receive a notification of the request. Further, upon selection of the "view nearby UAV drop-off locations" selection option 714, the customer user device 106A can be directed to an interface for viewing common drop-off locations for the unmanned vehicle 104 located within a predetermined distance of the customer user device 106A. In some arrangements, if the drop-off location for the unmanned vehicle 104 is within a certain distance (e.g., within 5 miles) of the customer user device 106A, the drop-off location is displayed on a map of the nearby surroundings in response to the customer 107A selecting the "view nearby UAV drop-off locations" selection option 714. In other arrangements, the unmanned vehicle 104 may come directly to the location of the customer user device 106A instead of a predetermined drop-off location. In other arrangements, the viewing area 702 includes other options that the customer 107A can select, such as options for splitting the cash delivery request between more than one bank account, entering a preferred delivery time, or entering a preferred authorization method, such as using a virtual identity card for authenticating the customer 107A when picking up the cash from the unmanned vehicle 104 (and the cash container device 140).

Figure 8:
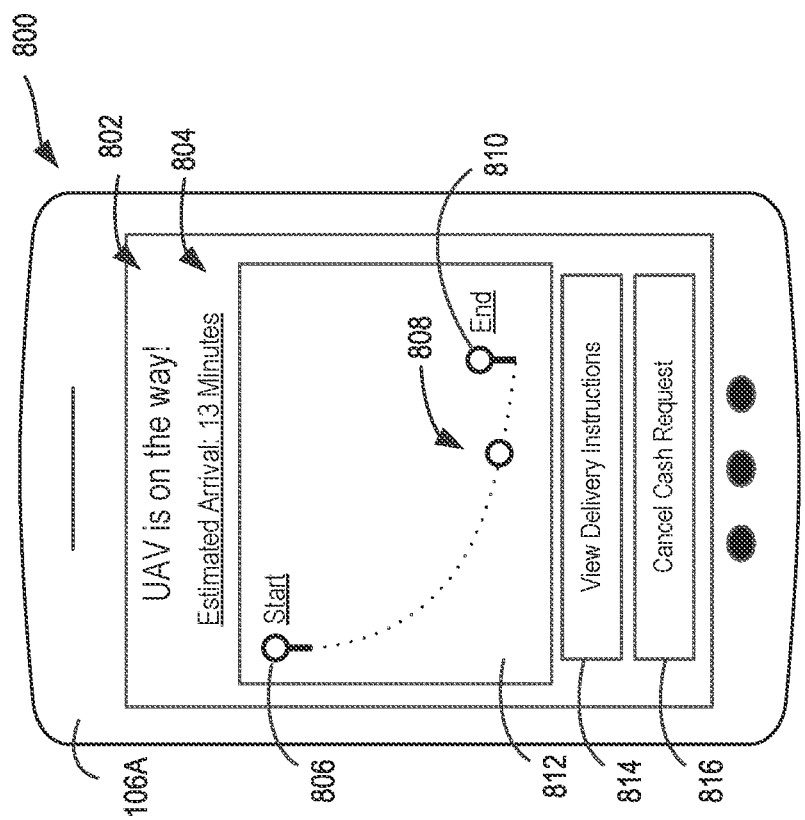
FIG. 8 is a schematic drawing depicting an example user interface of the customer user device used in the environment of FIG. 1 after a cash delivery request is made, according to various arrangements.

FIG. 8 depicts an example user interface 800 for displaying via the customer user device 106A the progress of the unmanned vehicle 104 on the flight path 105 to deliver the cash to the customer 107A, according to various arrangements. The user interface 800 can include a viewing area 802, an "Estimated Arrival" information 804, a map 812, and cash delivery selection options 814-816. The map 812 can be displayed to the customer 107A to show an overview of the flight path 105, or may be zoomed in on the current location of the unmanned vehicle 104 with respect to the flight path 105. The map 812 can show the first location of the unmanned vehicle 104 when the unmanned vehicle 104 launches and begins the flight path 105 to the various customers as the "Start" location 806. The tracked, current location of the unmanned vehicle 104 may be shown as a current UAV location 808. The map 812 may show the "End" location 810 as the location of the customer user device 106A where the unmanned vehicle 104 will land and deliver cash to the customer 107A in response to successful authentication. In some arrangements, the "Start" location 806 of the flight path 105 is at a location of the base for the unmanned vehicle 104 where the cash container device 140 is loaded and the unmanned vehicle 104 charges. The UAV's (e.g., the unmanned vehicle 104's) current location 808 can be shown on the map 812 by tracking the current location of the unmanned vehicle 104. The user interface 800 shows a "view delivery instructions" selection option 814 and a "cancel cash request" selection option 816. Upon the selection of the "view delivery instructions" selection option 814, a text window can be generated and displayed via the customer user device 106A. The delivery instructions may include information on how to use the cash container device 140, how to use a CAC received by the customer user device 106A, etc. Upon selection of the "cancel cash request" selection 816, the customer 107A can end the cash delivery request and a message can be automatically transmitted to the provider computing system 102, indicating the cash delivery request has been canceled. In some examples, in response to the customer 107A choosing the "cancel cash request" selection option 816, the user interface 800 exits and returns to a home page of the online cash delivery application on the customer user device 106A.

Referring now to FIG. 9, an example user interface 900 for the customer user device 106A is shown, according to various arrangements. Referring to FIGS. 1A-9, in some examples, the user interface 900 is displayed on the customer user device 106A in response to the provider computing system 102 authenticating the customer 107A when the unmanned vehicle 104 (and the cash container device 140) arrive at the location of the customer user device 106A. In other examples, the user interface 900 is not displayed on the customer user device 106A until the drone (e.g., the unmanned vehicle 104) is near the location of the customer user device 106A. The user interface 900 is shown to include a viewing area 902, a barcode 904, and selection options 906-908. The barcode 904 may be scanned by the customer user device 106A to provide authentication with respect to the cash delivery when the unmanned vehicle 104 lands and the customer 107A is retrieving the cash from the cash container device 140. In some arrangements, instead of the barcode 906, a different type of CAC is used for authentication by the provider computing system 102. For example, instead of the barcode 906, an input box for entering a PIN or alphanumeric code is displayed on customer user device 106A. The user interface 900 is shown to include a "track delivery progress" selection option 906 and a "view requested cash delivery info" selection option 908. The "Track delivery progress" selection option 906 may generate a user interface the same or similar as the user interface 800 (FIG. 8). Upon selection of the "view requested cash delivery info" selection option 908, the customer user device 106A may navigate, via the online cash delivery application, to a user interface depicting the various details of the cash delivery request made. For example, the amount of cash requested, delivery preferences specified in the request, information on the calculated delivery path (e.g., the flight path 105) and the unmanned vehicle 104 delivering the cash request, and so on, may be displayed via the customer user device 106A in response to the "view requested cash delivery info" selection option 908 being selected.

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on).

The "circuit" may also include one or more dedicated processors communicatively coupled to one or more dedicated memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may comprise or otherwise share the same processor which, in some example arrangements, may execute instructions stored, or otherwise accessed, via different areas of memory). Alternatively or additionally, the one or more processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, et.), microprocessor, etc.

An example system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some arrangements, the non-volatile media may take the form of ROM, flash memory (e.g., flash memory such as NAND, 3D NAND, NOR, 3D NOR), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example arrangements described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions may be made in the design, operating conditions and arrangement of the arrangements without departing from the scope of the present disclosure as expressed in the appended claims.

What is claimed is:

1. A method of delivering cash by an unmanned vehicle to customers at different locations, comprising:
    loading, by a robotic device into one or more of a plurality of compartments of a cash container in an unmanned aerial vehicle, the plurality of the compartments in a loading order based on one or more prioritization factors corresponding to one or more of a plurality of customers;
    causing the unmanned aerial vehicle to travel by a path from a current location of the unmanned aerial vehicle to one or more locations of one or more user devices of the plurality of customers, the path based on one or more cash delivery requests from the user devices via a communications network and having a delivery order corresponding to the prioritization factors; and
    causing, in response to an instruction by a provider computing system, the unmanned aerial vehicle to open one or more of the plurality of the compartments in response to authenticating a corresponding customer of the plurality of customers or a corresponding user device of the user devices that generated a corresponding cash delivery request for which each of the compartments is storing cash.

2. The method of claim 1, wherein the prioritization factors comprise at least one of a shortest distance to the locations, an amount of cash requested, a transaction history of the plurality of customers, a demand for cash at each of the locations, and a severe life event associated with one or more of the customers.

3. The method of claim 2, wherein the transaction history comprises at least one of past payments, purchases, cash withdrawals, account balances, current loans, and credit card statements.

4. The method of claim 2, wherein the demand for cash is determined by the provider computing system using data from social media postings, the locations, and a frequency of ATM withdrawals near the locations.

5. The method of claim 1, wherein the path of the unmanned aerial vehicle is determined based at least in part on the prioritization factors.

6. The method of claim 1, wherein the path of the unmanned aerial vehicle begins at a location of a base for the unmanned vehicle where the cash container is loaded and the unmanned vehicle charges.

7. The method of claim 1, wherein the provider computing system authenticates the corresponding customer of the plurality of customers or the corresponding user device of the user devices by using one or more of cash authentication codes (CACs), biometric responses, virtual identity cards, credit cards, cameras, or GPS location data.

8. The method of claim 1, wherein the compartments of the cash container are configured to individually and independently be unlocked and opened by the provider computing system.

9. The method of claim 1, wherein the cash is counted by a bill counter as the cash is loaded automatically into the compartments of the cash container.

10. An unmanned aerial vehicle to deliver cash to different locations, the vehicle comprising:
   one or more of a plurality of compartments of a cash container; and
   memory and one or more processors to:
   receive, from a robotic device into one or more of the plurality of compartments, cash into one or more of the plurality of the compartments in a loading order based on one or more prioritization factors corresponding to one or more of a plurality of customers;
   travel by a path from a current location of the unmanned aerial vehicle to one or more locations of one or more user devices of the plurality of customers, the path based on one or more cash delivery requests from the user devices via a communications network and having a delivery order corresponding to the prioritization factors;
   authenticating a corresponding customer of the plurality of customers or a corresponding user device of the user devices that generated a corresponding cash delivery request for which each of the compartments is storing cash; and
   open, in response to an instruction by a provider computing system, one or more of the plurality of the compartments in response to the authenticating.

11. The vehicle of claim 10, wherein the prioritization factors comprise at least one of a shortest distance to the locations, an amount of cash requested, a transaction history of the plurality of customers, a demand for cash at each of the locations, and a severe life event associated with one or more of the customers.

12. The vehicle of claim 11, wherein the transaction history comprises at least one of past payments, purchases, cash withdrawals, account balances, current loans, and credit card statements.

13. The vehicle of claim 11, wherein the demand for cash is determined by the provider computing system using data from social media postings, the locations, and a frequency of ATM withdrawals near the locations.

14. The vehicle of claim 10, wherein the path of the unmanned aerial vehicle is determined based at least in part on the prioritization factors.

15. The vehicle of claim 10, wherein the path of the unmanned aerial vehicle begins at a location of a base for the unmanned vehicle where the cash container is loaded and the unmanned vehicle charges.

16. The vehicle of claim 10, wherein the provider computing system authenticates the corresponding customer of the plurality of customers or the corresponding user device of the user devices by using one or more of cash authentication codes (CACs), biometric responses, virtual identity cards, credit cards, cameras, or GPS location data.

17. The method of claim 10, wherein the compartments of the cash container are configured to individually and independently be unlocked and opened by the provider computing system.

18. The method of claim 10, wherein the cash is counted by a bill counter as the cash is loaded automatically into the compartments of the cash container.

19. A robotic device to deliver cash to different locations, the robotic device comprising:
   loading, into one or more of a plurality of compartments of a cash container in an unmanned aerial vehicle, the plurality of the compartments in a loading order based on one or more prioritization factors corresponding to one or more of a plurality of customers;
   causing, in response to the loading, the unmanned aerial vehicle to travel by a path from a current location of the unmanned aerial vehicle to one or more locations of one or more user devices of the plurality of customers, the path based on one or more cash delivery requests from the user devices via a communications network and having a delivery order corresponding to the prioritization factors; and
   causing, in response to an instruction by a provider computing system, the unmanned aerial vehicle to open one or more of the plurality of the compartments in response to authenticating a corresponding customer of the plurality of customers or a corresponding user device of the user devices that generated a corresponding cash delivery request for which each of the compartments is storing cash.

20. The robotic device of claim 19, wherein the prioritization factors comprise at least one of a shortest distance to the locations, an amount of cash requested, a transaction history of the plurality of customers, a demand for cash at each of the locations, and a severe life event associated with one or more of the customers.

* * * * *